US008510043B1

(12) United States Patent
Whiton et al.

(10) Patent No.: US 8,510,043 B1
(45) Date of Patent: Aug. 13, 2013

(54) SYSTEMS AND METHODS OF DISPLAYING ROUTE INFORMATION ON AN ELECTRONIC DISPLAY

(75) Inventors: Joshua Whiton, Raleigh, NC (US);
Nathan Villaescusa, Cary, NC (US);
Jason Feinstein, Raleigh, NC (US)

(73) Assignee: Transloc Inc., Raleigh, NC (US)

( * ) Notice: Subject to any disclaimer, the term of this patent is extended or adjusted under 35 U.S.C. 154(b) by 0 days.

(21) Appl. No.: 13/421,638

(22) Filed: Mar. 15, 2012

(51) Int. Cl.
*G01C 21/26* (2006.01)

(52) U.S. Cl.
USPC .......................................... 701/454; 701/533

(58) Field of Classification Search
USPC ................................................ 701/454, 533
See application file for complete search history.

(56) References Cited

U.S. PATENT DOCUMENTS

| 5,448,485 | A  | * | 9/1995  | Ishibashi et al. ............. 701/533 |
| 5,623,260 | A  |   | 4/1997  | Jones |
| 6,006,159 | A  |   | 12/1999 | Schmier et al. |
| 6,278,936 | B1 |   | 8/2001  | Jones |
| 6,313,760 | B1 |   | 11/2001 | Jones |
| 6,317,060 | B1 |   | 11/2001 | Jones |
| 6,374,176 | B1 |   | 4/2002  | Schmier et al. |
| 6,401,030 | B1 | * | 6/2002  | Watanabe et al. ............. 701/533 |
| 6,411,891 | B1 |   | 6/2002  | Jones |
| 6,415,207 | B1 |   | 7/2002  | Jones |
| 6,718,262 | B2 |   | 4/2004  | Matsuda et al. |
| 7,739,029 | B2 | * | 6/2010  | Ishikawa et al. ............. 701/117 |
| 7,880,645 | B2 | * | 2/2011  | Park ............................. 340/994 |
| 7,920,967 | B1 |   | 4/2011  | Harris et al. |
| 8,175,793 | B2 | * | 5/2012  | Stanton ........................ 701/532 |
| 2006/0155464 | A1 |   | 7/2006  | Smartt |
| 2006/0220920 | A1 |   | 10/2006 | McCauley et al. |
| 2006/0241855 | A1 |   | 10/2006 | Joe et al. |
| 2009/0310325 | A1 | * | 12/2009 | Wong et al. .................. 361/807 |
| 2010/0153004 | A1 | * | 6/2010  | Natsume ....................... 701/201 |
| 2011/0175756 | A1 |   | 7/2011  | Whiton et al. |
| 2012/0053830 | A1 | * | 3/2012  | Bach ............................. 701/438 |

FOREIGN PATENT DOCUMENTS

JP 2005114695 A * 4/2005

OTHER PUBLICATIONS

Hoar, Ricardo, "Visualizing Transit Through a Web Based Geographic Information System", World Academy Science, Engineering and Technology, vol. 46, 2008, pp. 180ff.*

Biuk-Aghai, Robert P., "MacauMap: Handheld Digital Map of Macau", Proceedings of Symposium on Technological Innovation in Macau 2002, Macau, Dec. 14, 2002, pp. 149-158.*

Mike S post on the Wirefresh web site entitled, "TFL's new interactive bus map for Londoners", dated Feb. 24, 2010.*

(Continued)

*Primary Examiner* — James Trammell
*Assistant Examiner* — David Testardi
(74) *Attorney, Agent, or Firm* — Coats & Bennett, P.L.L.C.

(57) ABSTRACT

Systems and methods of displaying route information on an electronic display. The information includes a number of routes that extend within the displayed area. A large amount of information about the routes is stored in or accessible by the system. Therefore, the systems and methods are configured to initially display a map with much of the information being withheld. This initial map is clean and the displayed information is relevant to the user. The system is then configured to receive input requesting that the system display more specific information about the relevant routes of interest to the user.

18 Claims, 20 Drawing Sheets

(56) References Cited

OTHER PUBLICATIONS

Solano Express Interactive Route Map Web Site (4 pages of documentation describing the Solano Express Interactive Route Map, retrieved from e.g., http://www.solanoexpress.com/Content/10000/preview.html and http://solanoexpress.com/docs.php?oid=1000000057&ogid=1000000003 ), flash map version dated Aug. 3, 2011.*

The Paris Bus and Train System Interactive Map Web Site (15 pages of documentation describing the Interactive Paris Bus/RER/train/Metro/Tram Map, retrieved from e.g., http://www.ratp.fr/plan-interactif/cartebus.php?lang=uk and http://untourscafe.com/profiles/blogs/part-1-the-paris-bus-system ), screen shots showing map operation dated May 29, 2010.*

Plan Métro (map) Web Site (4 pages of documentation describing the Interactive Paris Metro Map, retrieved from http://acme.com/metro/ and http://blog.gmapsite.com/2008/07/interactive_paris_metro_map.html ), with screen shots showing the Paris Metro lines overlaid on a Google Street Map dated Jul. 17, 2008.*

TranSystems memo regarding the TransLoc TVS (published on the Internet and downloaded from http://www.cctaride.org/pdf/Documents/Strategy%20Committee/TransLocAnalysis%20v1.5.pdf ), memo date Feb. 19, 2010, 4 pages.*

Morgan, Seth. Washington Metro Route Map, Dec. 20, 2004. http://world.nycsubway.org/us/washdc/routemap.html.

Stanford University Parking & Transportation Services. Marguerite Real-Time Schedule & Interactive Shuttle Schedule. 2 pages. http://fops-cf.standford.eedu/stanford_ivl/.

Nextbus. 3 pages. http://www.nextbus.com/predictor/publicMap.shtml.

Siemens ILG. "Siemens TransitMaster Webwatch Precision Real-Time Bus Monitor." 2003. 1 page. http://www.ilgsystems.com/webwatch.

All Saferides. 1 page. http://shuttletrack.mit.edu/allroutes.php.

Rutgers Transit. "Where is My Bus." 3 pages. http://www.whereismybus.com/left.html.

\* cited by examiner

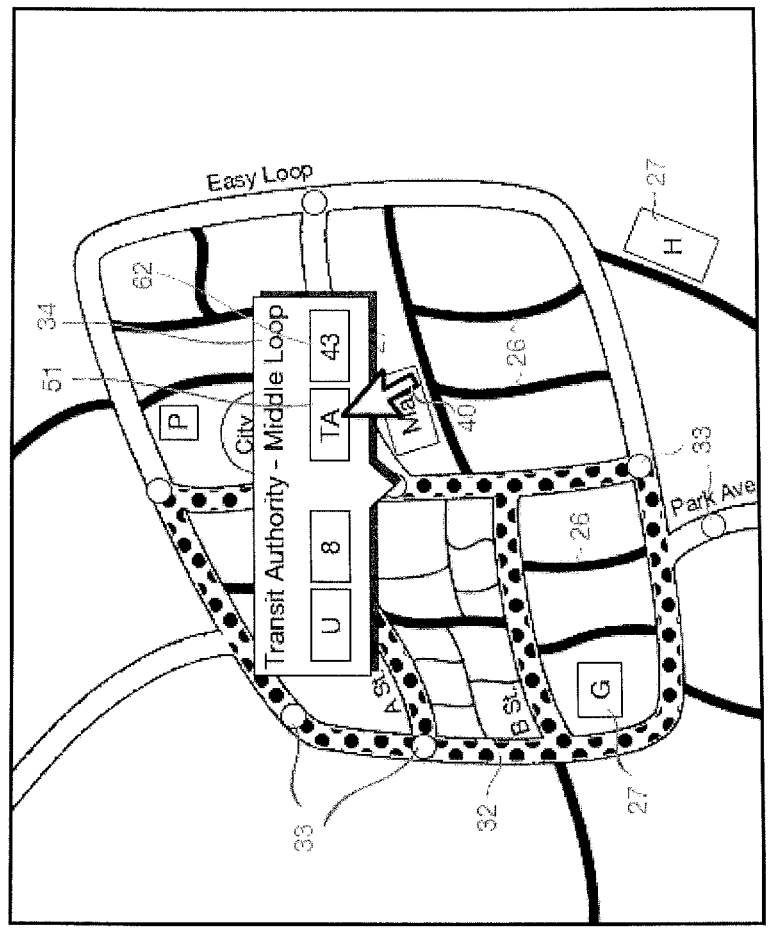

SYSTEMS AND METHODS OF DISPLAYING ROUTE INFORMATION ON AN ELECTRONIC DISPLAY

BACKGROUND

The present application is directed to systems and methods of providing route information on an electronic display and, more particularly, to systems and methods of displaying route information in a meaningful way without initially providing too much information.

Maps exist for displaying a variety of different types of information. The maps may include the geography of a region including oceans, lakes, rivers, mountains, deserts, etc. The maps may also include man-made aspects, such as routes, buildings, towns, cities, etc. Maps may also display the product flow through a building. The information associated with the map may include broad, general aspects, such as the border of a state or country, as well as more detailed, narrow aspects such as a specific route within a town.

A user viewing the map may only be interested in a relatively small amount of the information. For example, the user may be interested in a specific location on the map, or a particular service offered within the area of the map.

The manner of displaying the information to the user is important to ensure the user receives the relative information in a manner that he/she can comprehend. Displaying too much information may only confuse the user and obfuscate the relevant information. However, displaying just broad features on the map may frustrate the user who is in need of more detailed information.

There is a need for systems and methods of displaying information on a map in a logical manner that does not confuse the user. The systems and methods should display a first amount of information on the map that orients the user and introduces general broad concepts. The systems and methods should also be configured to display additional information that is relevant to the user.

SUMMARY

The present application is directed to systems and methods of displaying route information on an electronic display. One aspect includes a method implemented by a server communicatively coupled to a client device for causing the client device to display a graphical depiction of route information on an electronic display. The method includes sending the client device executable instructions that, when executed by one or more processing circuits of the client device, cause the client device to display serviced routes and non-serviced routes that extend within a geographic area with each of the serviced routes having a common appearance that is different than the non-serviced routes. The method also includes that responsive to receiving input regarding a selected one of the serviced routes, continue to display each of the serviced and non-serviced routes and display an additional highlight on the selected route that has a different appearance than the non-serviced routes and the other serviced routes.

The application also includes a method for causing a client device to display a graphical depiction of route information on an electronic display. The method includes sending the client device executable instructions that, when executed by one or more processing circuits of the client device, cause the client device to display serviced routes and non-serviced routes that extend within a geographic area with each of the serviced routes being displayed with a first indicator having a first appearance and each of the non-serviced routes being displayed with a different second indicator having a different second appearance. The method also includes that responsive to receiving input regarding a selected location within the geographic area that lies on a first route of the serviced routes, display the first route with a combination of the first indicator and a third indicator, display a remainder of the serviced routes with the first indicator and display the non-serviced routes with the second indicator. The combination of the first indicator and the third indicator has a third appearance that is different than the first and second appearances.

The application also includes a server communicatively coupled to a client device and configured to send the client device executable instructions that, when executed by one or more processing circuits of the client device, cause the client device to display a graphical depiction of route information on an electronic display. The executable instructions cause the client device to display serviced routes and non-serviced routes that extend within a geographic area with each of the serviced routes being displayed with a first indicator having a first appearance and each of the non-serviced routes being displayed with a different second indicator having a different second appearance. Responsive to receiving input regarding a selected location within the geographic area that lies on a first route of the serviced routes, display the first route with a combination of the first indicator and a third indicator, display a remainder of the serviced routes with the first indicator and display the non-serviced routes with the second indicator, with the combination of the first indicator and the third indicator having a third appearance that is different than the first and second appearances.

The various aspects of the various embodiments may be used alone or in any combination, as is desired.

BRIEF DESCRIPTION OF THE DRAWINGS

FIGS. 13*a* and 15*a*, illustrate maps on an electronic display that include various amounts of information according to various embodiments.

DETAILED DESCRIPTION

Figure 1:
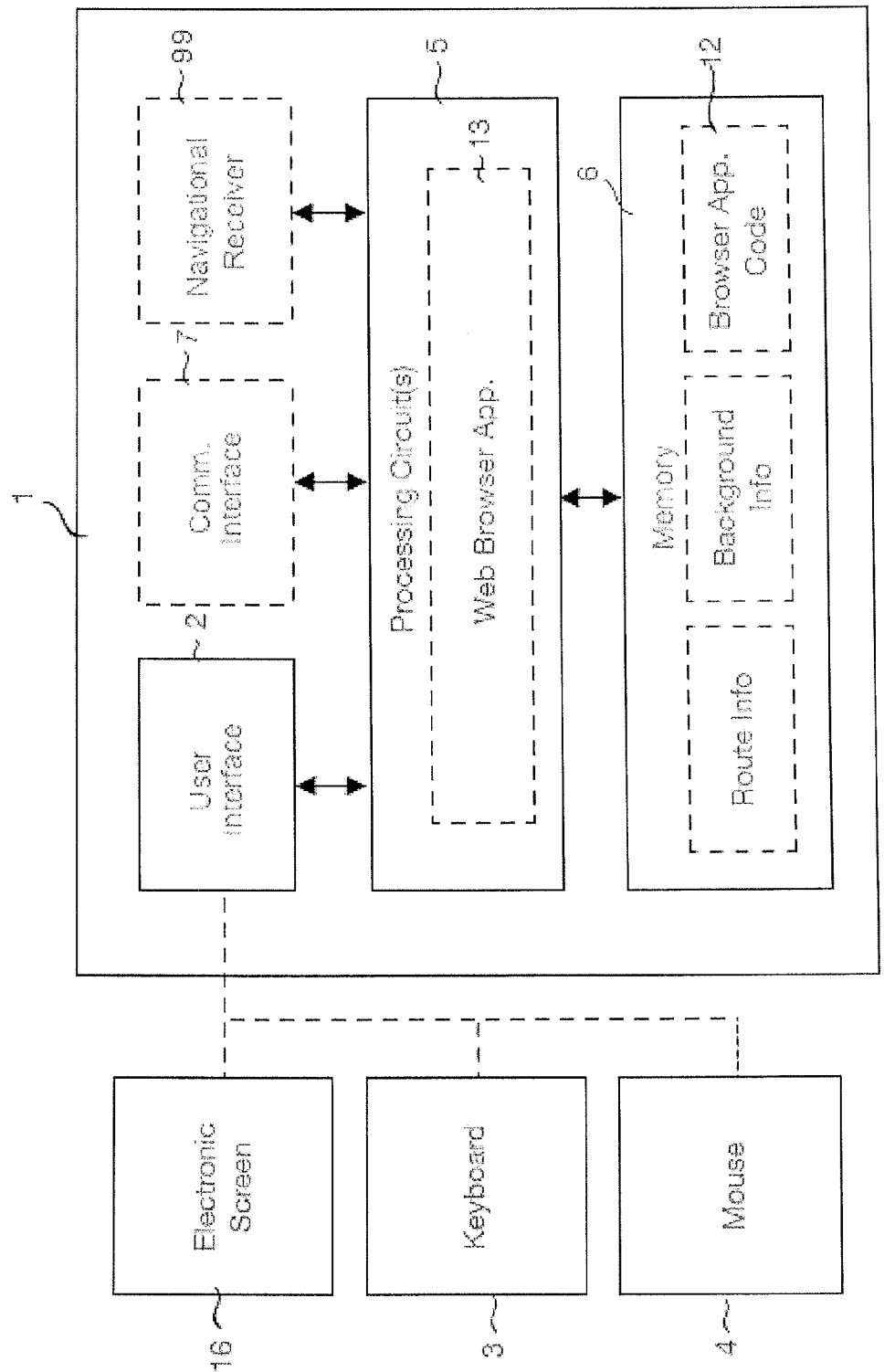
FIG. 1 is a block diagram of an electronic device for displaying a graphical depiction of route information on an electronic screen according to one or more embodiments.

The present application is directed to systems and methods of displaying route information on an electronic display. The route information includes a number of routes that extend within the displayed area. A large amount of information about the routes is stored in or is accessible by the system. This information would be difficult to comprehend by a user if it all was initially displayed. Therefore, the systems and methods are configured to initially display a map with much of the information being withheld. This initial map is clean and the displayed information is relevant to the user. The system is then configured to receive input requesting that the system display additional and/or more specific information about the relevant routes of interest to the user.

The information displayed includes background information and route information. The background information includes geographic aspects of the area and provides a context for the route information. The background information may include geographic aspects of the area such as lakes, rivers, mountains, islands, etc. The background information may also include governmental boundaries such as countries, states, cities, towns, etc. In some contexts when the map relates to a manufacturing process, the background information may include the layout of a warehouse, assembly process, and the like. Identifying names may also be included for these various types of background information depending upon the detail of the display.

The route information includes routes that extend within the displayed area. The routes include serviced routes that are part of a particular service relevant to the user, and non-serviced routes that do not include the particular service. The serviced routes are those that are serviced by a particular service, such as one or more transportation systems. Transportation systems may include bus lines, airlines, trains, trucks, taxis, boats, and combinations thereof. These transportation systems may be used for carrying various types of cargo, including but not limited to people and freight. The serviced routes may also identify process flow steps along an assembly line. The non-serviced routes are other routes in the display area that do not include the particular service (e.g., a small road that does not include bus service). The route information may also be directed to other process configurations, such as network processes, business logic processes, and service failure processes.

Route information may further include one or more targets that move along the serviced routes. These targets may include the vehicles in the various transportation systems such as buses, cars, trucks, trains, planes, etc. The targets may also include freight, such as mail, luggage, manufactured goods, and the like. The route information shows the progression of these targets along the corresponding serviced routes.

The system is further configured to display the map at various levels of detail. The levels of detail may vary from a macro level, such that the user can view a continent or state, to a micro level, such that the user can view a specific town or portion of an assembly line. The system is configured for the user to be able to select the desired level of detail. The level establishes, at least in part, the amount of detail regarding the background and route information that is displayed on the map. This ensures that the map does not include too much detail that makes it difficult for the user to obtain the relevant information.

FIG. 1 depicts an electronic device 1 operated by the user. The device 1 includes a user interface 2 configured to' interact with the user. This user interface 2 includes or is otherwise associated with the electronic screen 16 on which the map is displayed. The user interface 2 also includes one or more input devices which provide the device 1 with input from the user. An input device may include, for example, a keyboard 3 or mouse 4. The electronic screen 16 may also serve as an input device if, for example, it comprises a touch screen. The device 1 further includes one or more processing circuits 5 and memory 6.

In some embodiments, the device 1 serves as a stand-alone system capable of displaying the maps as described herein. The device 1 may comprise, for instance, a stand-alone kiosk located at a transportation station or stop (e.g., at a bus stop). In this case, the device's memory 6 stores the background information and route information. The device's processing circuit(s) access and process this stored information to display the map on the electronic screen 16 in accordance with user input received via the user interface 2.

Figure 2:
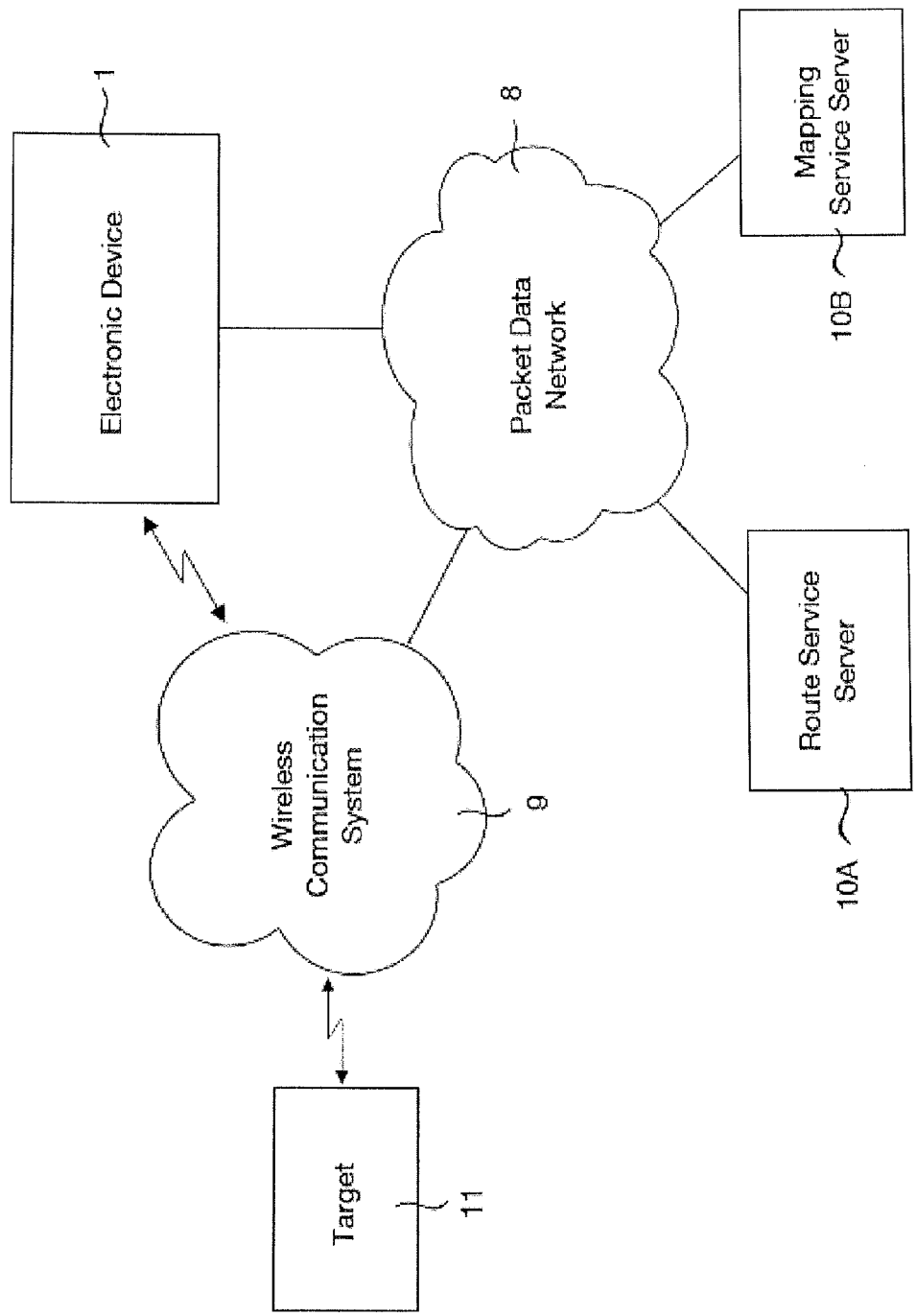
FIG. 2 is a block diagram of a route visualization system that includes an electronic device and one or more servers for displaying a graphical depiction of route information on an electronic screen according to one or more embodiments.

In other embodiments, the device 1 receives at least some of the background information and/or route information from other nodes, via a communications interface 7. FIG. 2 illustrates various examples of these embodiments.

In FIG. 2, the device's communications interface 7 communicatively couples the device 1 to one or more servers 10A, 10B. The communications interface 7 may couple the device 1 to these servers 10A, 10B via a packet data network 8 (e.g., the Internet) and/or a wireless communications system 9 (e.g., a High Speed Packet Access (HSPA) system). The device 1 receives route information from server 10A, referred to as the route service server, and receives background information from server 10B, referred to as the mapping service server. Receiving information from servers 10A, 10B in this way, the device 1 may be referred to as a client device 1.

As noted above, the route information may include the location of targets moving along routes. In this regard, one or more targets 11 may determine and report their location to the route service server 10A via the wireless communication system 9 and the packet data network 8. The route service server 10A then relays these target locations to the client device 1.

Regardless, the servers 10A and 10B comprise web servers in one particular embodiment. Referring back to FIG. 1, the device's processing circuits 5 in this case execute web browser application code 12 stored in memory 6, to thereby create a web browser application 13. This web browser application 13 receives a web page or other executable instructions (e.g., a Flash file) from one of the servers, such as the route service server 10A. The executable instructions contain client-side script that references an external Application Programming Interface (API) provided by the other server, i.e., the mapping service server 10B. The web browser application 13 is configured to import the external API and execute the instructions and external API as an aggregated web application (also known as a "mashup"). The runtime environment that supports this aggregated web application includes the route information and background information as client-side resources available for use at the client device 1.

With the route information and background information accessible as client-side resources, the web browser application 13 aggregates the information to display the map. In at least some embodiments, the route information specifies the location of available routes using the same coordinate system as that used by the background information to specify the location of geographic aspects of the area. The web browser application 13 then effectively overlays a layer of route information on top of a layer of background information to generate the map in accordance with input received from the user.

In at least some embodiments, the client device 1 receives all of the route and background information needed to display the map, at any level of detail, for a particular area of interest. User input may thereafter be received directing the client device 1 to display the map for a different area of interest. Responsive to such input, the client device 1 requests that the servers 10A, 10B provide the device 1 with all of the route and background information needed to display the map, at any level of detail, for this new area of interest. By requesting and receiving information as needed for different areas of interest, the client device 1 efficiently utilizes the communication resources of the system.

While the client device 1 was described above as receiving the background information from a different server than the server from which it received the route information, in other embodiments the client device 1 receives the background and route information from the same server. In general, therefore, the client device 1 receives executable instructions from one or more servers 10 that cause the device 1 to display a graphical depiction of the route information on an electronic screen 16 (in the context of the background information). Such executable instructions may comprise, for example, static or dynamic client-side script sent to the client device 1 by the server 10 in the context of a web page request. The instructions may therefore comprise any combination of Javascript, Actionscript, or other client-side script. The instructions may alternatively comprise compiled code.

In another embodiment, the client device 1 determines at least some of the route and background information on its own. This information is not received through a server.

Figure 3:
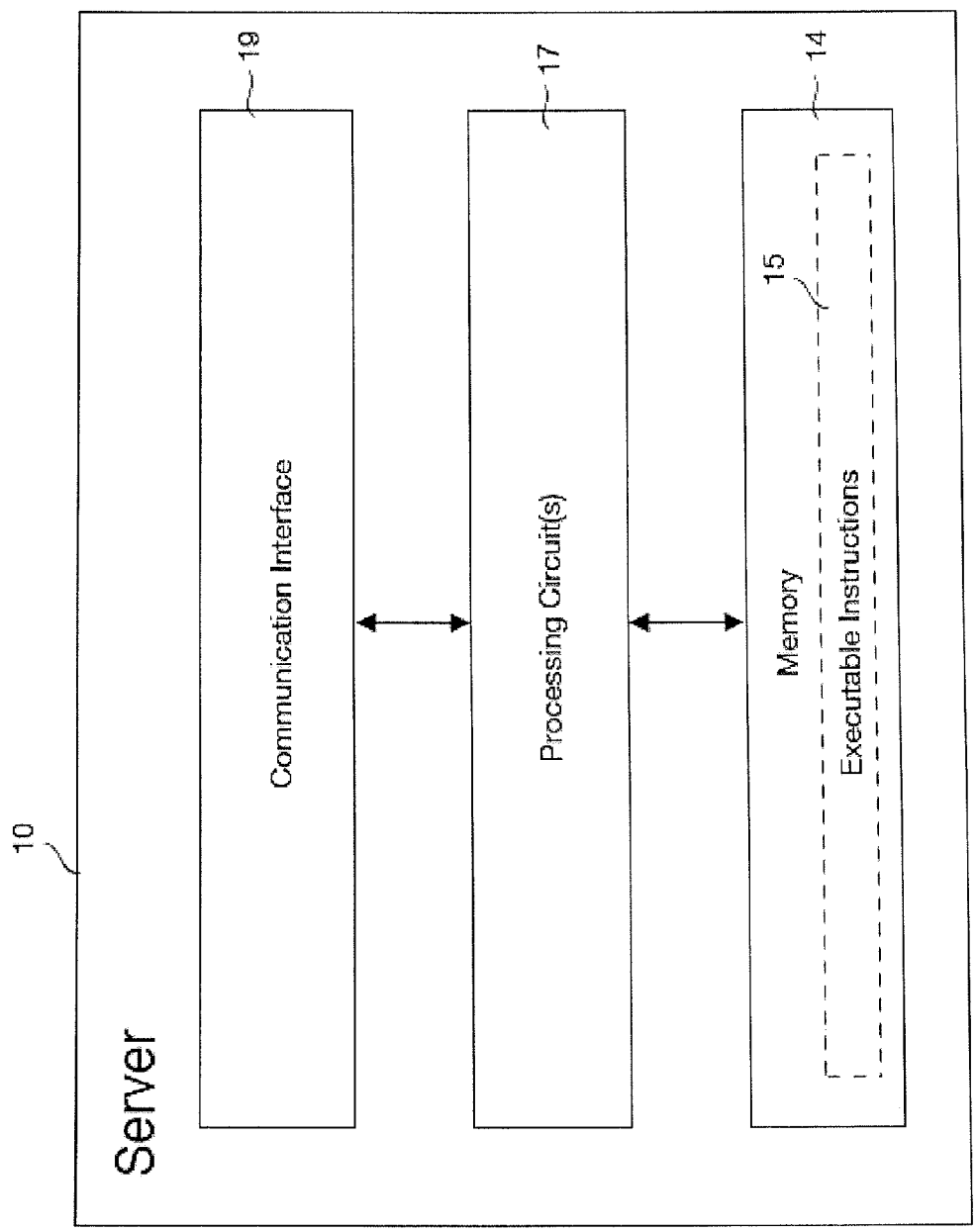
FIG. 3 is a block diagram of a server for displaying a graphical depiction of route information on an electronic screen of a client device according to one or more embodiments.

FIG. 3 generally illustrates such embodiments from the perspective of a server 10. The server 10 includes a memory 14, one or more processing circuits 17, and a communications interface 19. In some embodiments, the memory 14 stores at least some executable instructions 15 to be sent to the client device 1. Alternatively or additionally, the memory 14 stores server-side script that dynamically generates some or all of the executable instructions 15 to be sent to the client device 1. Regardless, the one or more processing circuits 17 are configured to receive, via the communications interface 19, a request for these executable instructions 15 from the client device 1. Responsive to receiving such a request, the one or more processing circuits 17 retrieve executable instructions 15 from memory 14 and/or dynamically generate executable instructions 15, and then send them to the client device 1 via the communications interface 19.

The executable instructions 15, when executed by the one or more processing circuits 5 of the client device 1, cause the client device 1 to display a graphical depiction of route information on its electronic display 16. Specifically, the executable instructions 15 cause the client device 1 to display serviced routes and non-serviced routes that extend within an area. When displayed in this way, each of the serviced routes has a common appearance so as to provide a uniform visual indication of an aggregate of the serviced routes. For example, the serviced routes may each have the same color (e.g., white). In some embodiments, the common appearance of the serviced routes renders different serviced routes indistinguishable from one another. Regardless, each of the non-serviced routes has a different appearance than the serviced routes (e.g., the non-serviced routes may be colored black).

With the routes displayed in this way, the client device 1 may be configured to receive user input regarding a selected one of the serviced routes. Responsive to such user input, the executable instructions 15 cause the client device 1 to continue to display each of the serviced and non-serviced routes as discussed above, but to display an additional highlight on the selected route. This additional highlight has a different appearance than the non-serviced routes and the other, non-selected serviced routes. For example, the additional highlight may have yet another color (e.g., red). This additional highlight serves to distinguish the selected route from the other, non-selected serviced routes as well as the non-serviced routes.

In some embodiments, the executable instructions cause the client device 1 to display the serviced routes with broad indicators. These broad indicators are wider than indicators displayed for the non-serviced routes. Moreover, the broad indicators may have a different color (e.g., white) than the indicators for the non-serviced routes (e.g., black). In this case, the additional highlight on the selected route may include a narrow indicator positioned within and/or overlaid onto the corresponding broad indicator of the selected route. The narrow indicator may be yet a different color (e.g., red).

In view of the above modifications and variations, those skilled in the art will appreciate that the server 10 in FIG. 3 more generally sends executable instructions 15 that cause the client device 1 to display selected routes with a combination of different indicators. That is, in general, the executable instructions 15 cause the client device 1 to display serviced routes with a first indicator and to display non-serviced routes with a second indicator. The first indicator has a first appearance, and the second indicator has a second appearance that is different than the first appearance.

With the routes displayed in this way, the client device 1 may be configured to receive user input regarding a selected location within the geographic area that lies on a first route of the serviced routes. Responsive to such user input, the executable instructions 15 cause the client device 1 to display the first route with a combination of the first indicator and a third indicator. This combination of the first and third indicators has a third appearance that is different than the first and second appearances. Moreover, such display of the first route may occur while the client device 1 is still displaying the remainder of the serviced routes with the first indicator, and displaying the non-serviced routes with the second indicator.

Similar to previous embodiments, the first indicator may be a broad stripe and the third indicator may be a narrow line positioned within and/or overlaid onto an interior space of the broad stripe. The third indicator may also have a different color (e.g., red) than the first indicator (e.g., white).

The remaining Figures illustrate various aspects of the systems and methods of displaying route information. These maps displayed on the screen 16 are directed to a bus route system for transporting people around a geographic area. This is one example of use for displaying the maps. These aspects are applicable to a large variety of other contexts of use as described above.

Figure 4:
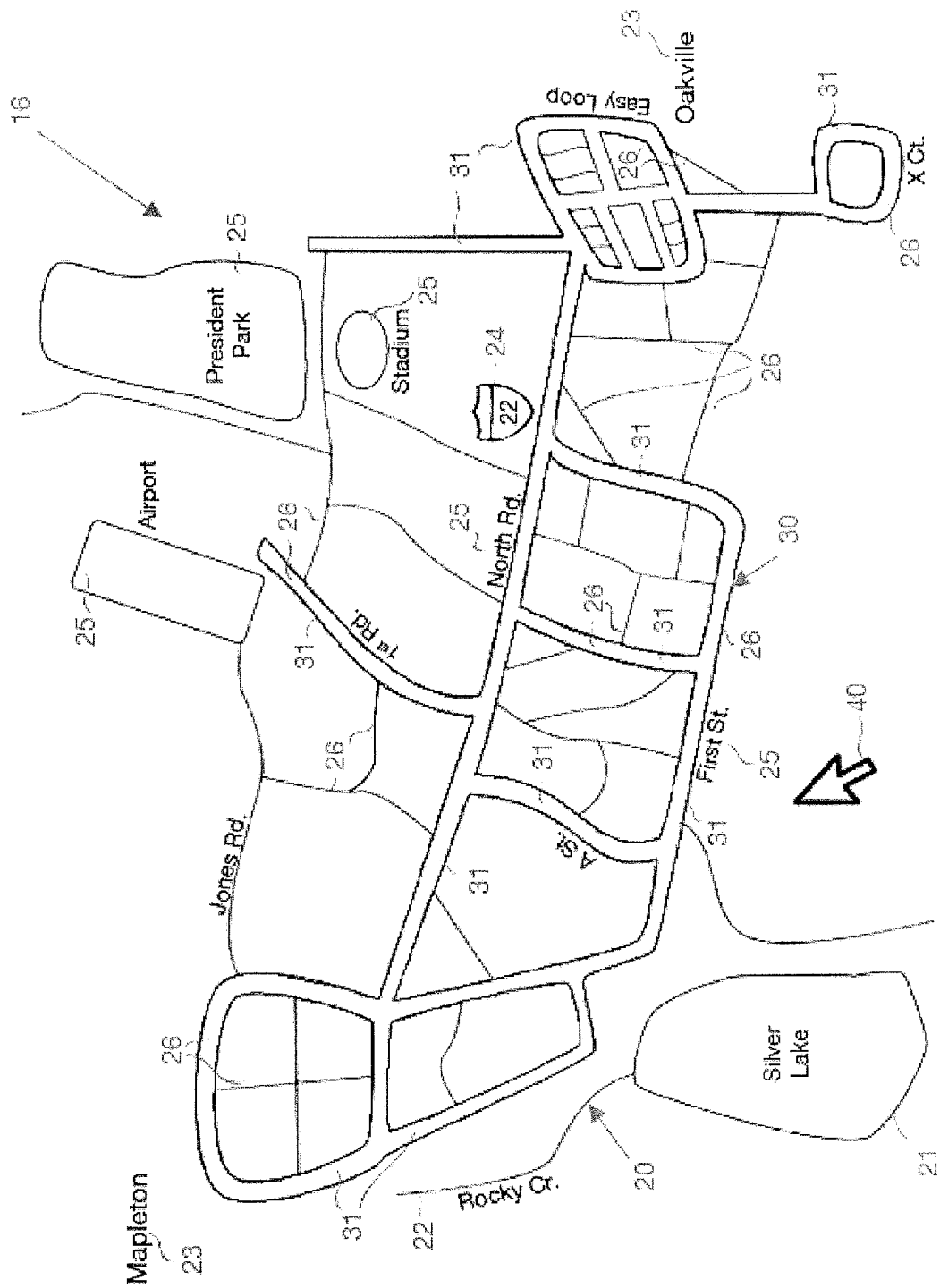
FIGS. 4-18, including

FIG. 4 illustrates a screen 16 with a map of a broad geographic area that is serviced by various bus routes. This view of a relatively broad geographic area may be the map that is initially displayed to the user. This view illustrates at a macro level major background information and route information that are relevant to determine a broad overview of the area. The amount of detail provided on the map is adequate for the user to become familiar with the geographic area and possible serviced routes. However, the system does not display too much information that causes the map to be confusing or cluttered with non-relevant information.

The background information provides a context for the route information 30. The background information may include geographic aspects of the area, including lakes 21, rivers 22, mountains, deserts. The background information may also include general topographic features such as hills, valleys, elevation, etc. The background information may also include town names 23, road names 24, and special features 25 (e.g., airport, park, stadium).

The route information includes routes 26 with serviced and non-serviced routes that extend through the geographic area. The system generally identifies the serviced routes by route husks 31, and the non-serviced routes by different indicators. In FIG. 4, these route husks 31 are represented as broad lines positioned over the routes that are serviced by buses. The route husks 31 may be highlighted on the map to facilitate viewing by the user. Route husks 31 in FIG. 4 are positioned over North Road, 1st Road, First Street, and X Court.

The non-serviced routes are displayed with different indicators than the serviced routes. For example, Jones Rd is a non-serviced route and has a different appearance than the service routes. This conveys to the user that the bus system does not service every route 26 within the area, but rather that just a finite number of routes 26 include bus service.

The map on the display 16 may include the different information in different colors. For example, the route husks 31 may be displayed in one or more colors, and the non-serviced routes and background information displayed in one or more different colors. In one specific embodiment, the route husks 31 are displayed in white, the majority of geography is displayed in gray, the non-serviced routes are displayed in yellow or black, the special features 25 are display in green, and the lakes and rivers are displayed in blue. Various other color schemes may be used to highlight the various pieces of information.

The map on the display 16 of FIG. 4 provides a first level of detail of the background and route information 20, 30. The amount of information is displayed in a clean format that preferably does not include overlapping names, or finite detail such as smaller routes or buildings that would cause the map to be cluttered and confusing to the user. For example, the routes illustrated within Easy Loop at the town of Oakville only include their basic positioning. This is necessary to prevent overlap of information, or too much information being displayed within a limited space on the map each of which would be difficult for the user to comprehend.

The first level of detail includes basic aspects of the background and route information 20, 30. The system may include more specific information that is not initially displayed for the purpose of keeping the map filled with relevant information. In one embodiment, each of the serviced routes available to the user is identified by route husks 31. This allows the user to know their options for taking a bus to the various geographic regions. In other embodiments, more detailed bus routes are not displayed by husks 31 at this basic level.

The system is configured to receive input that directs the system to display more detailed background and/or route information. For example, the system may include a cursor 40 that is movable over the map at the direction of the user. The user may move the cursor 40 using any number of input devices, including for example a mouse 4, a keyboard 3, a touch screen, voice recognition, or the like. Responsive to the user moving (i.e., "hovering") the cursor 40 over a specific piece of information on the map 15, the system displays additional detail regarding that piece of information. The system may alternatively require a mouse click or other affirmative action when the cursor 40 is positioned over the specific piece of information before displaying additional detail.

Different types of user input may direct the system to display different levels of detail. Consider, for example, an embodiment where a mouse controls movement of the cursor over the map. The mouse further includes input buttons. The system displays additional detail after the user moves the cursor 40 over a specific route husk 31, and displays yet further detail once the user clicks one or more of the mouse's input buttons.

The route husks 31 illustrate the routes that are serviced by the bus system. Initially, each of the route husks 31 has the same visual appearance as illustrated in FIG. 4. This provides the user with an overview of the various bus route options for travel. The system includes a route reveal feature that displays each bus route that extends through a specific location selected by the user. This allows the user to know options for bus routes at a particular location.

Figure 5:
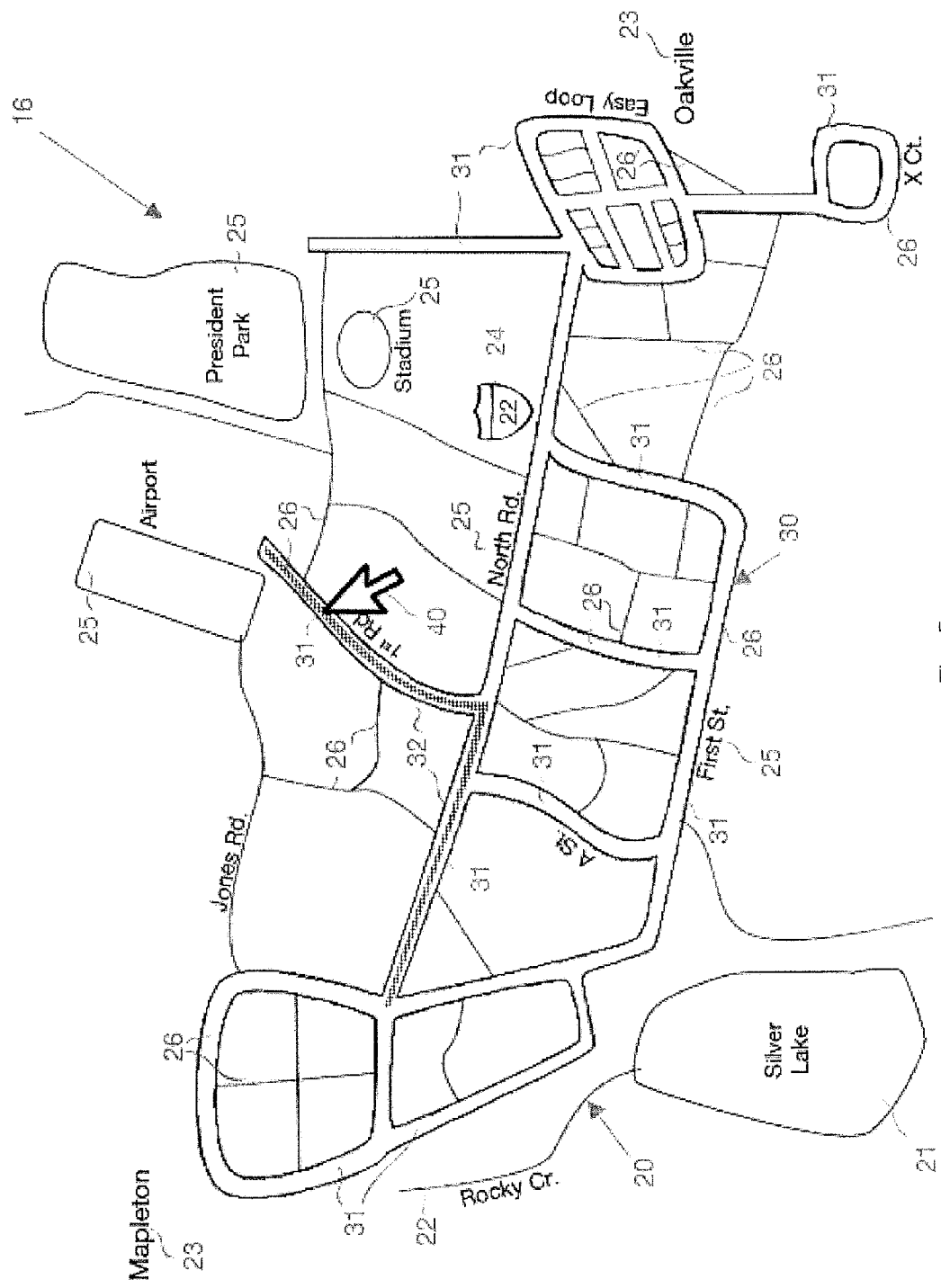

FIG. 5 illustrates the route reveal feature. In this embodiment, the system includes a cursor 40 that can be moved around the map. When the cursor 40 is moved over a route husk 31, any one or more of the bus routes 32 that pass through the location of the cursor 40 are illustrated on the map. These bus route or routes 32 are displayed on the map in their entirety. Using FIG. 5 as an example, the cursor 40 is positioned along 1$^{st}$ Rd. This location is serviced by a single bus route 32 which is highlighted on the display on the map and shown in its entirety as extending between the vicinity of Mapleton to the airport. The specific bus routes 32 are displayed in a manner to be accentuated/highlighted to the user. The bus route 32 may be a solid or dashed line, symbols such as but not limited to #, *, ^, and the like. The highlighted bus routes 32 may also include outlining or glowing either individually or in combination with other highlighting features. FIG. 5 includes the bus route 32 highlighted by a separate indicator positioned within the broad husk 31.

The route reveal feature displays the entirety of each of the bus routes 32 that service the specific location inputted by the user. When a user selects a location serviced by multiple bus routes 26, each of the routes 26 will be displayed in their entirety. The separate bus routes 26 are displayed in different manners to allow differentiation. This may include the different bus routes 26 displayed in different colors and/or with different symbols.

Figure 6:
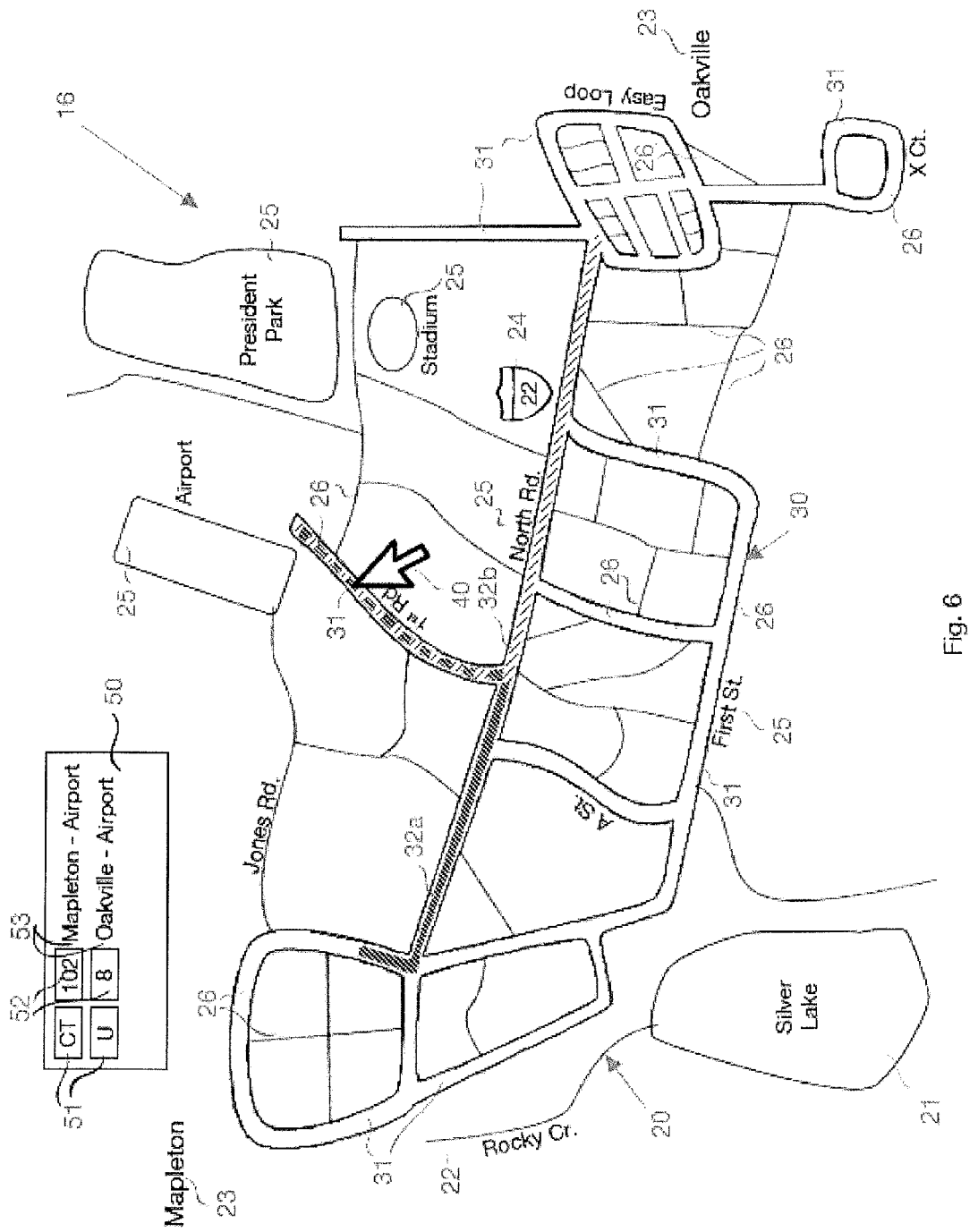

Bus routes 26 that extend along the same route husks 31 may be displayed in different ways. The system may use an interleaving pattern along the shared sections. Using the example of FIG. 6, the bus routes 32a, 32b are displayed in an interleaving pattern along the shared segment which includes 1$^{st}$ Rd. The specific interleaving pattern may vary. FIG. 6 includes the symbols representing the bus routes 32a, 32b directly alternating with the symbol for the first bus route 32a, followed by the symbol for the second bus route 32b. Other interleaving patterns may include two or more of each symbol followed by two or more of a second symbol. Aspects of displaying routes in an interleaving pattern are disclosed in U.S. Pat. No. 7,920,967 which is herein incorporated by reference in its entirety. The sections of the bus routes 32 that are not shared are illustrated with just the corresponding bus route symbol.

The shared segment may also be displayed with the different bus route symbols positioned in a side-by-side arrangement. The shared segment may also be displayed with a different symbol than either of the individual symbols. This may include a different color for the shared segment.

Figure 7:
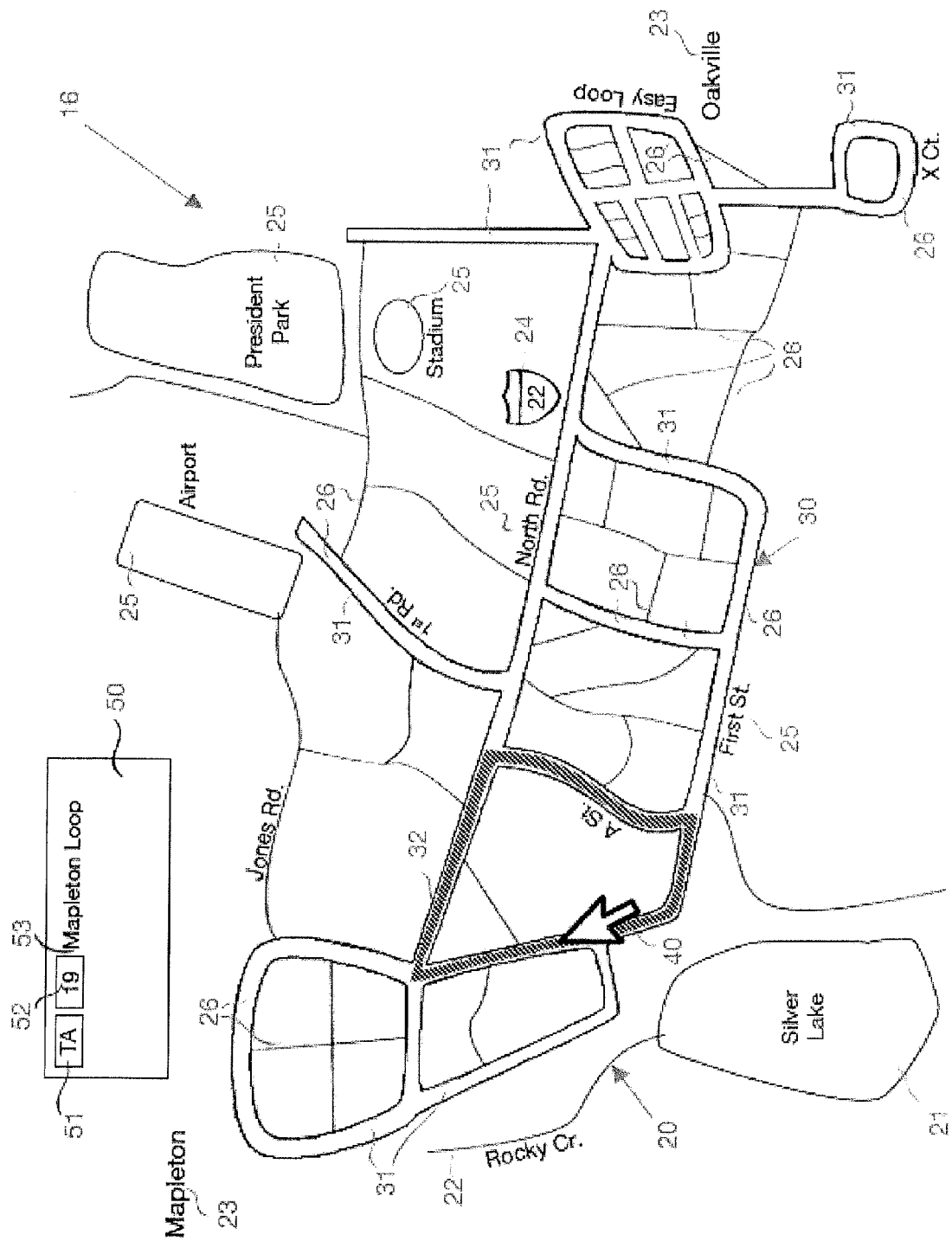

The system may further be configured to display a palette 50 with more detailed bus route information when an input is received from the user. FIGS. 6 and 7 include the palette 50 located in an upper corner of the map away from the selected route 32. The palette 50 may also be located at other positions on the map, or may be movable by the user within the map in the event it initially covers information relevant to the user. Further, the system does not display the palette 50 and associated information on the map until requested by the user. This ensures that more specific levels of information are not initially displayed until a request is entered by the user.

The palette 50 includes additional information about the selected bus route 32. In some embodiments, the palette 50 is displayed at the same time that the bus route 32 is highlighted within the map. The system may, for example, be configured to display the palette 50 based on the same input that highlights the selected bus route 32. In other embodiments, the system requires a second input to display the palette 50 (i.e., a first input highlights the selected bus route 32, and a second input displays the palette 50).

FIGS. 6 and 7 include the palette 50 with multiple aspects 51, 52, 53. A first aspect 51 includes the bus agency that services the selected route, such as TA to identify the Transit Authority. A second aspect 52 includes the route number, with the third aspect 53 including the name of the identified bus route 32. The palette 50 may include various numbers of aspects.

Figure 8:
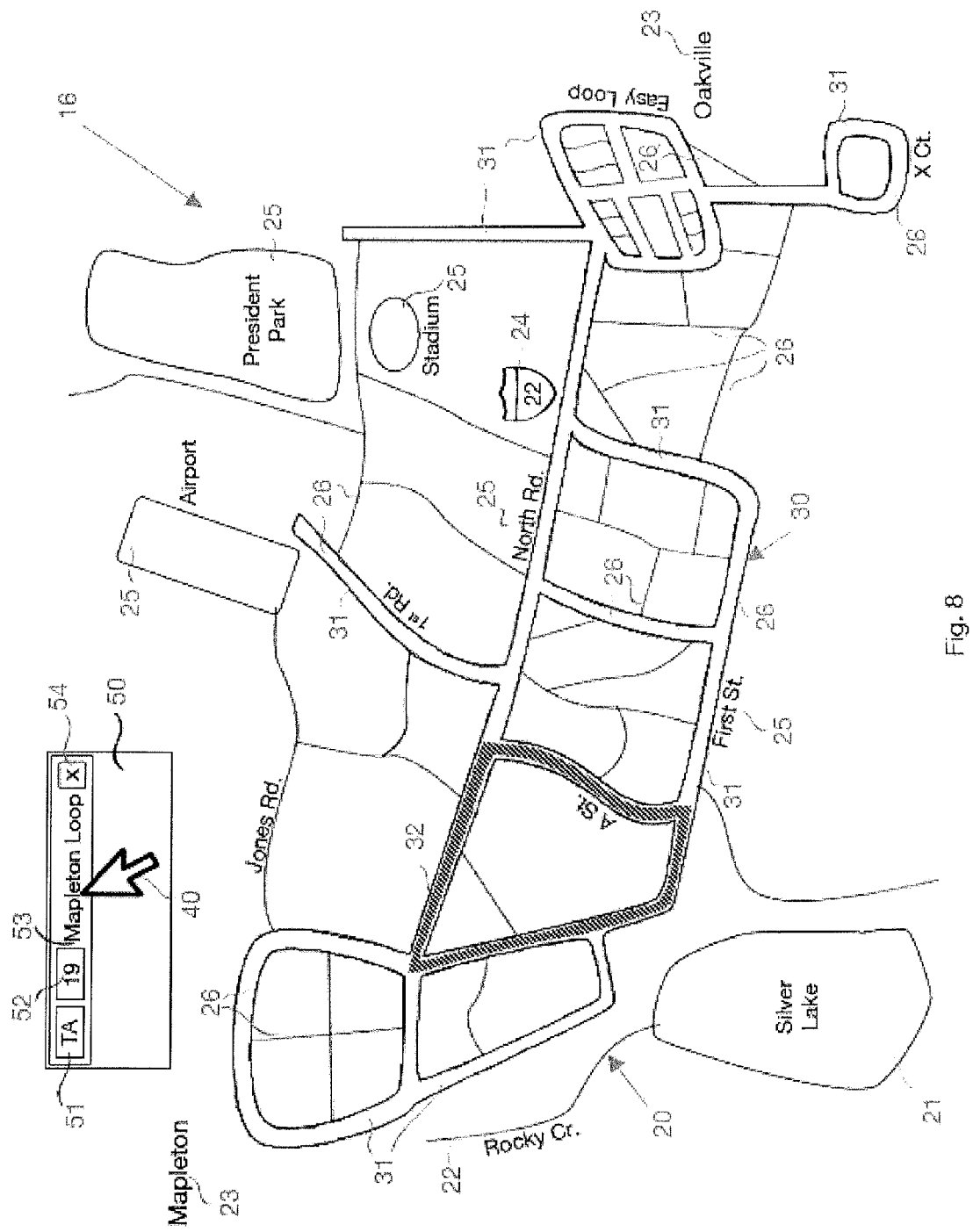

The system is configured to remove the palette 50 and identified bus route 32 from the map. Removal may include the user moving the cursor 40 over one of the aspects within the palette 50 as illustrated in FIG. 8. Placing the cursor 40 in the palette 50 over a particular bus route highlights the corresponding information. Further, a remove aspect 54 is illustrated in the palette 50. The user can move the cursor 40 over the aspect 54 and select an input that causes the bus route information to be removed from the palette 50. This also causes the bus route 32 to no longer be highlighted in the route husks 31. This removal feature allows the user to remove bus route information once it is no longer needed. The system may also remove specific bus route information from the palette 50 and/or route husks 31 after a predetermined period of time.

The palette 50 includes bus route information on the various bus routes highlighted in the route husks 31. As illustrated in FIG. 6, the palette 50 includes information about each of the two bus routes 32 that are highlighted in the husks 31. The system is configured for the user to select additional bus routes on the husks 31 which will also be highlighted on the husks 31 and included in the palette 50. The individual bus routes 32 may be removed from palette 50 and from being highlighted when an input command is received while the cursor 40 is on the aspect 54 as discussed above. In this manner, a user may simultaneously review multiple different routes 32 of interest. If the map becomes too cluttered, the user can remove excessive bus routes 32 as necessary.

When multiple bus routes 32 are displayed in the palette 50, the system is further configured to highlight a single one of the bus routes 32. This is accomplished by the user moving the cursor over the specific bus route 32 in the palette 50. Using FIG. 9 as an example, the cursor 40 is moved over the first bus route 32 in the palette 50 (e.g., Mapleton-Airport). In one method, the user simply moves the cursor 40 over the desired bus route. In another method, the user is also required to enter an input command while the cursor 40 is over the bus route. This causes the system to highlight just the selected bus route 32 on the route husks 31 in the display 16. The system may remove the other bus route 32 (e.g., Oakville-Airport) from the corresponding husks 31, or may just further emphasize the selected route 32 while the other route remains displayed on the husks 31. One method includes the selected route 32 displayed in a blinking fashion, with the other routes being statically displayed.

Figure 9:
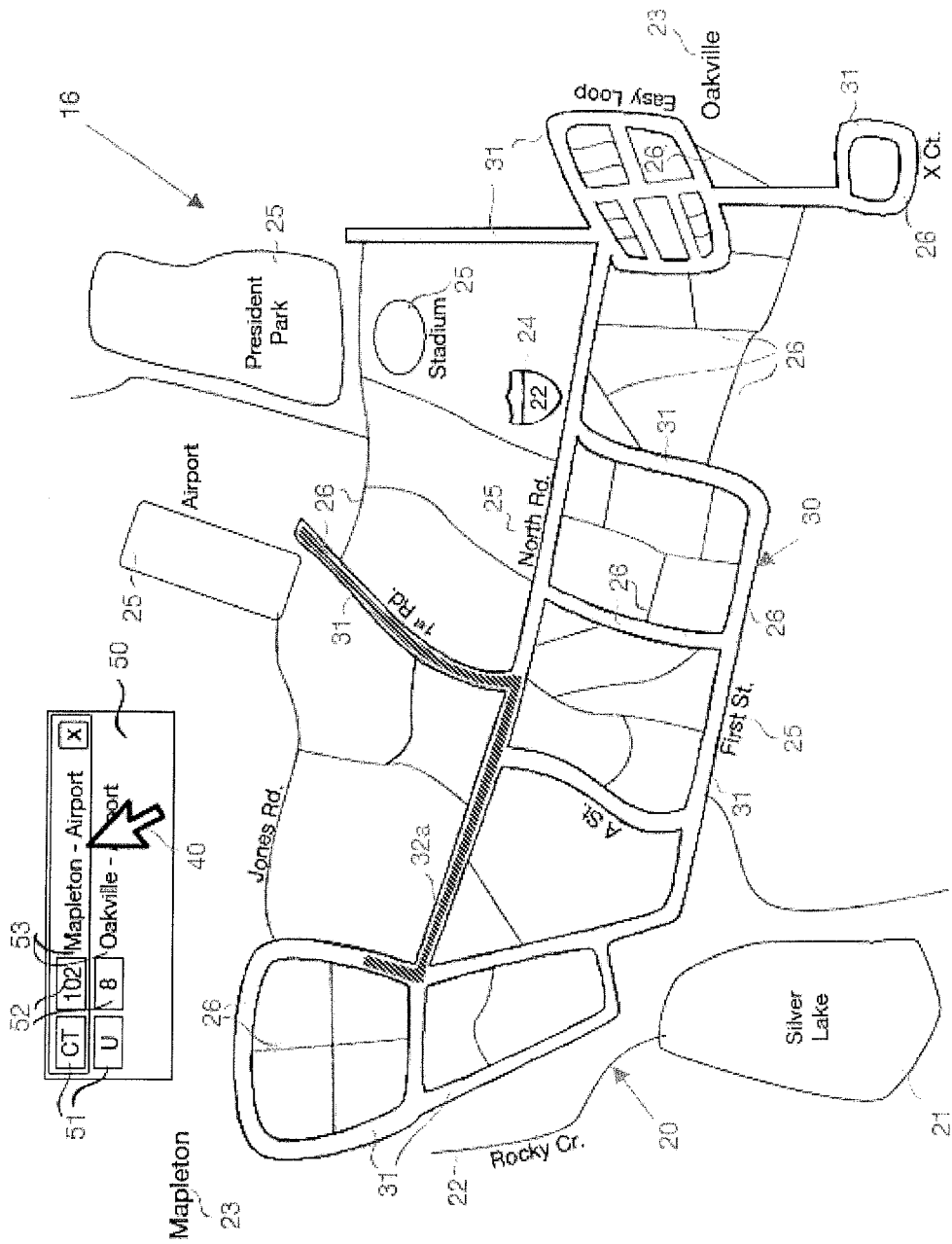

If the selected route 32 from the palette 50 has a shared segment with another route from the palette 50, the system may only display the selected route 32 along the shared segment. This is illustrated in a comparison of FIGS. 6 and 9. This results in the shared segment changing from an interleaving pattern as illustrated in FIG. 6 to just the selected route 32 as illustrated in FIG. 9.

In the various methods, the system clearly highlights the desired route to bring it to the attention of the user.

The system emphasizes a particular bus route 32 when the cursor 40 remains positioned over the corresponding route information in the palette 50. Moving the cursor 40 away from the routes 32 in the palette 50 results in each of the bus routes 32 being displayed in the map with an equal emphasis.

The system displays a more detailed map when the user limits the area. The smaller area allows the system to display more detailed information within the space allocated in the display 16. Despite the size of the area, the system may include each of the bus routes 32 that service the area. This enables the user to see the available options while viewing each of the various maps.

Figure 10:
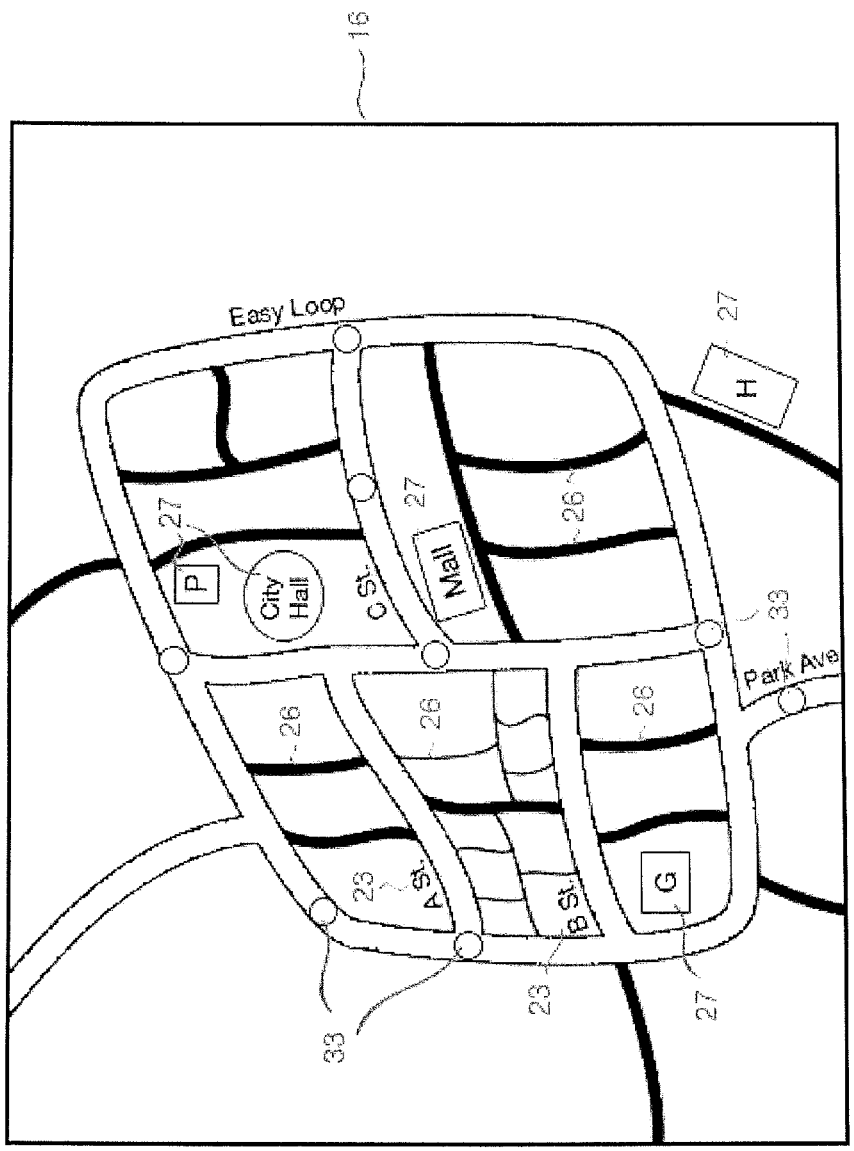

The larger views of the overall area may include a display 16 with a first scale. One example is one inch of the map equating to 10 miles. FIGS. 4-9 include maps at this first scale. Based on the broad information at this broad level, the user is able to drill down to obtain more detailed information. The user is able to focus on a smaller geographic area to obtain more detailed information about serviced routes in the smaller area. FIG. 10 includes an example with a map having a smaller scale (e.g., one inch equating to 1 mile). This closer view allows for the display 16 to include more detail than is available in the larger scale. Detailed features 27 such a gas station G, hospital H, mall, city hall, and police station P are included in the map. Further, additional non-serviced routes that extend throughout the area are included in the map.

Bus stops 33 are another detail that can be displayed on the map by the system. The bus stops 33 are illustrated along the various husks 31 and indicate where the user can catch one of the buses that service the area. FIG. 10 illustrates one example with the bus stops 33 displayed as circles on the route husks 31. In one specific example, the bus stops are displayed in white while the remainder of the information is illustrated in one or more different colors.

The system provides this next level of detail in a manner that is clean to be easily comprehended by the user. The exact amount of detail is based on the scale of the map selected by the user. The system does not display additional information until requested by the user. This ensures the map does not initially include superfluous information that is not relevant to the user.

Figure 11:
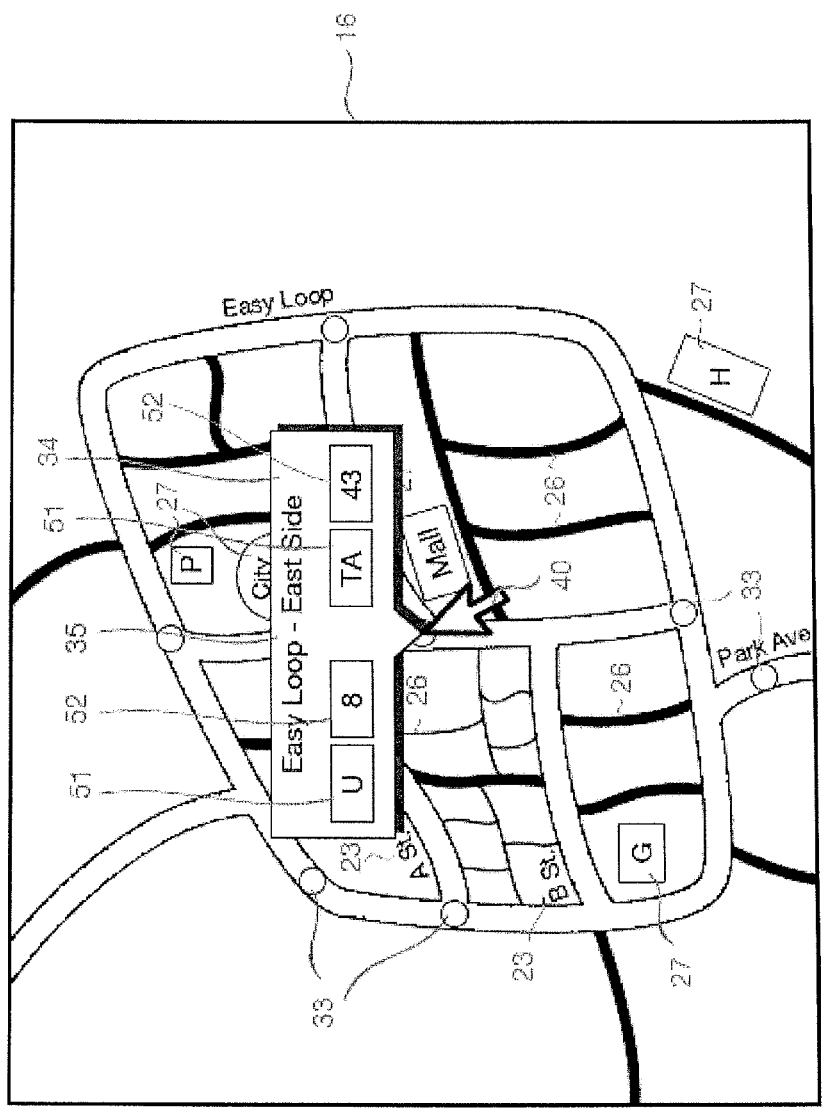

FIG. 11 illustrates additional information displayed on the map based on the user moving the cursor 40 to a particular bus stop 33. The additional information is presented in a palette 34 similar to the palette 50 previously discussed. The palette 34 may be positioned at various locations on the map, but preferably is in proximity to the selected bus stop 33 to assist the user in recognizing that this information relates to this particular bus stop 33. The palette 34 includes more specific information about the particular bus stop 33, such as the name 35 of the stop. In FIG. 11, the name 35 is Easy Loop—East Side. Also included in the palette 34 are aspects 51, 52 that include the agency that operates the bus route, and the route number. The bus stop 33 selected in FIG. 11 is serviced by two separate bus routes 32.

Figure 12:
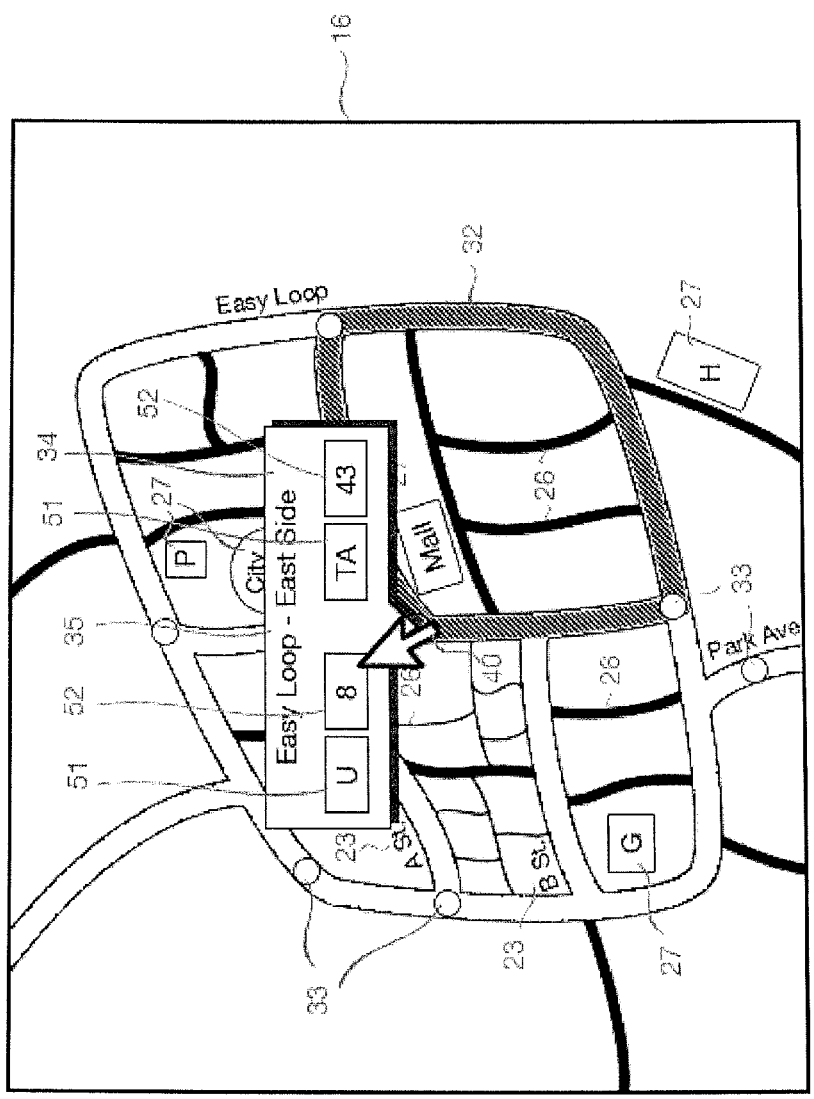

In some embodiments, the bus routes 32 are highlighted along the corresponding husks 31 when the palette 34 is displayed on the map. Other embodiments include highlighting the bus routes after an additional input from the user. FIG. 12 includes the specific bus route 32 being highlighted as a result of the user moving the cursor 40 over the information in the palette 34. The selected route 32 is highlighted without any additional information being displayed on the map which again allows the user to focus on the relevant information without being overwhelmed by extra non-relevant information.

Figure 13:
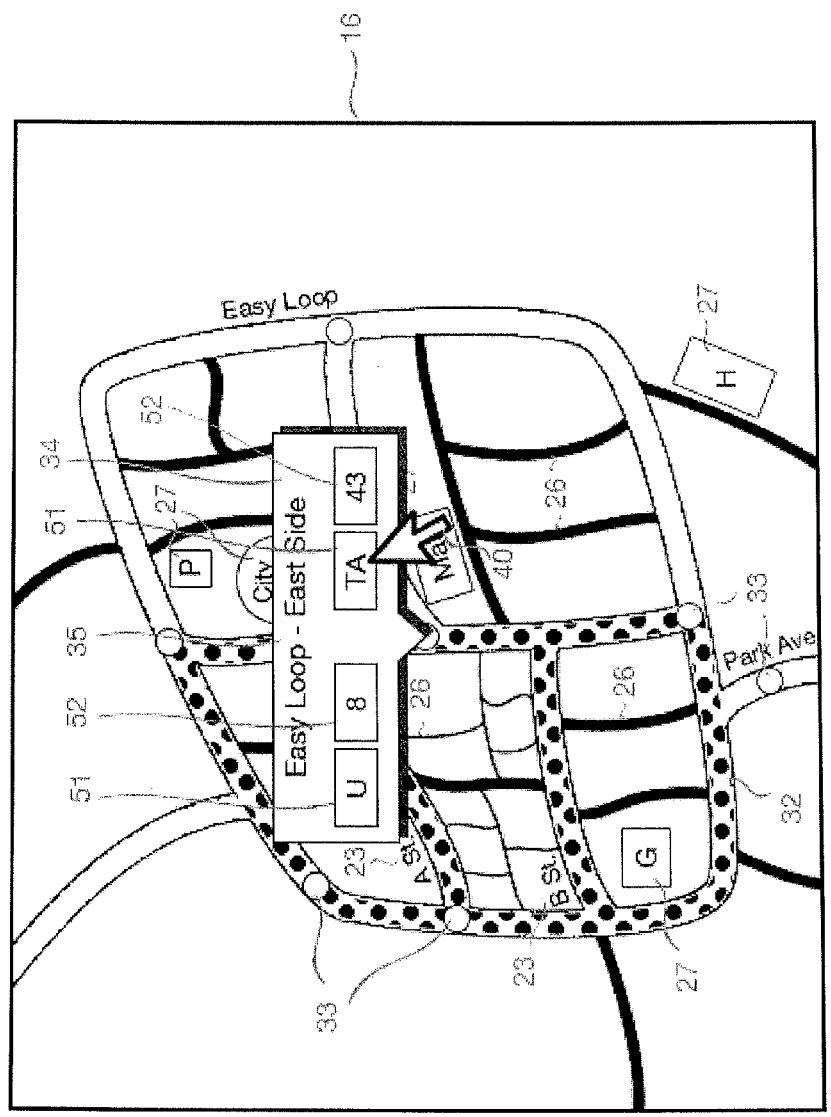

FIG. 13 includes the second bus route 32 being highlighted on the husks 31 as a result of the user moving the cursor 40 over the corresponding route information. Further, the route information from the first route (e.g., route 8) is no longer displayed on the map. In one embodiment, the user can enter a second input while the cursor is over the information in the palette 34 for the route 32 to remain highlighted in the husks 31 after the cursor is removed from the information. Using this technique, a user may simultaneously highlight multiple different bus routes on the map.

Further information may be displayed as desired by the user. In one embodiment as illustrated in FIG. 13A, moving the cursor 40 over one or more of the agency 51 and corresponding route number 52 causes a full name of the bus route to be displayed. In the embodiment of FIG. 13A, moving the cursor 40 over the agency 51 results in the name of the agency (Transit Authority) and the name of the bus route (Middle Loop) to be displayed. Other embodiments may include displaying just the bus route. In the various embodiments, the display of the full name may occur simultaneously with highlighting of the bus route 32 on the map.

The system may further display the route information according to the different agencies that service the area represented in the map. This may be beneficial for a user who has a bus pass for a single agency and desires to know possible travel options.

Figure 14:
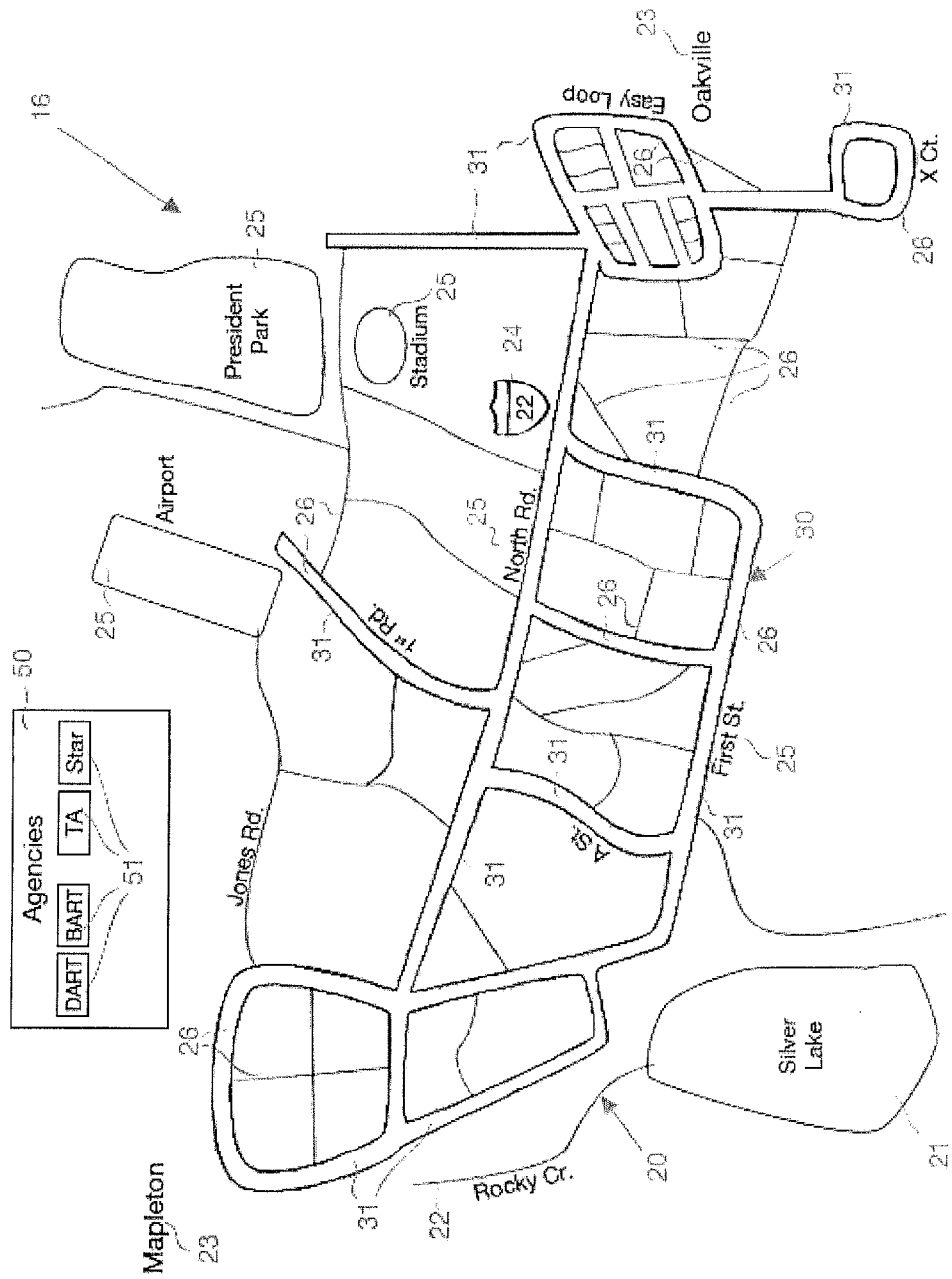

FIG. 14 illustrates a display 16 with an initial map of a geographic area and a palette 50 with the various agencies that service the area. The different available agencies are displayed by aspects 51 in the palette 50. Further, the bus routes for each of the agencies are displayed by husks 31 on the map. In one embodiment, the husks 31 each have the same appearance regardless of which agency services the route.

The system is configured to display the corresponding bus routes for a particular agency based on input from the user. In one embodiment, moving the cursor 40 over the desired aspect 51 in the palette 50 causes just the bus routes for that particular agency displayed as husks 31 on the map.

Figure 15:
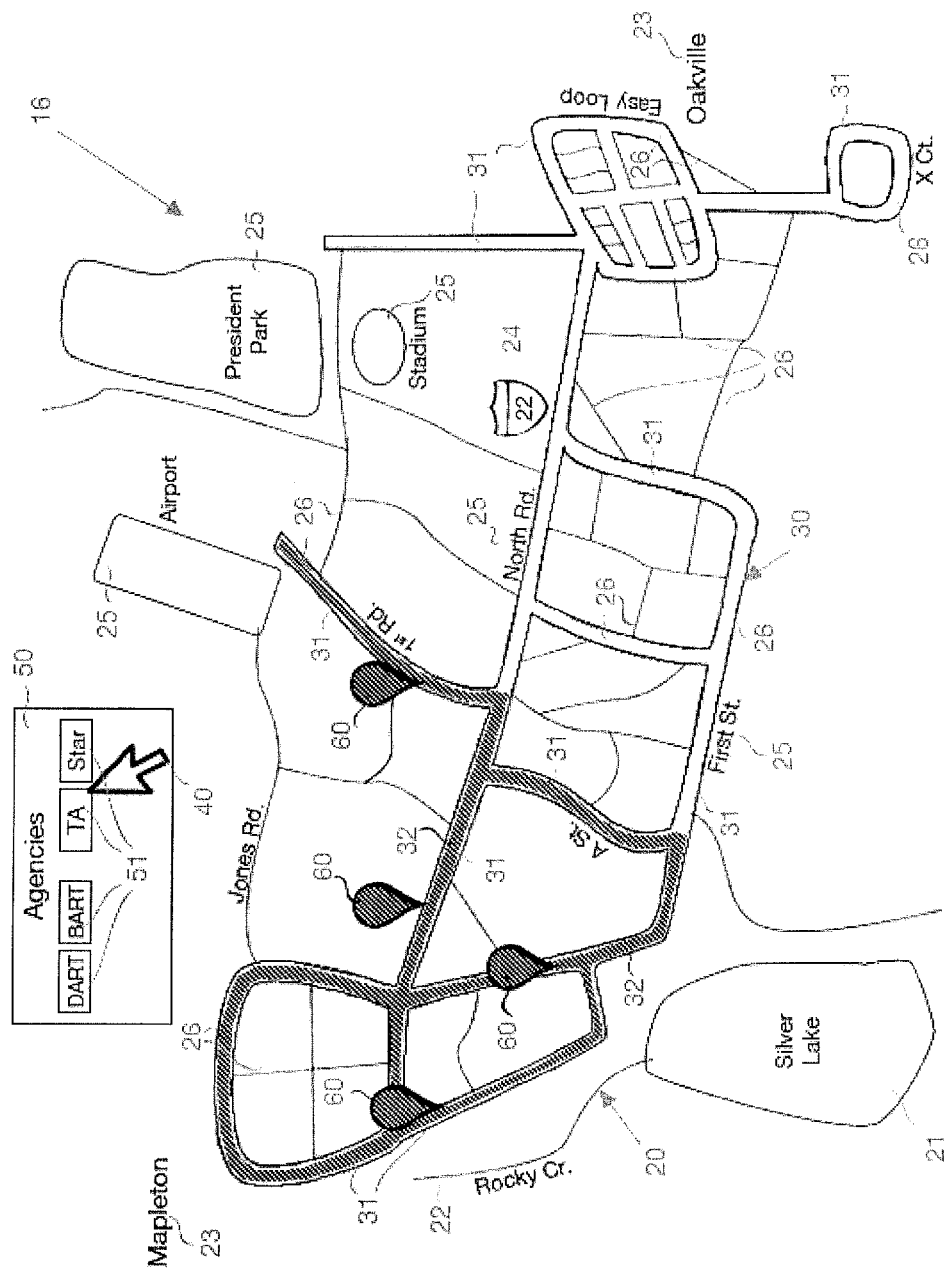

FIG. 15 includes an example with the cursor 40 positioned over the aspect 51 for the agency TA. The corresponding routes that are serviced by agency TA are then highlighted on the map. This aspect provides the user with the ability to see where they can travel with buses operated by this particular agency. The bus routes that are not serviced by the selected agency are not highlighted. FIG. 15 includes these other routes 32 represented as husks. In other embodiments, these other husks 31 are not included in the map to further emphasis just the information about the desired agency requested from the user.

Figure 15A:
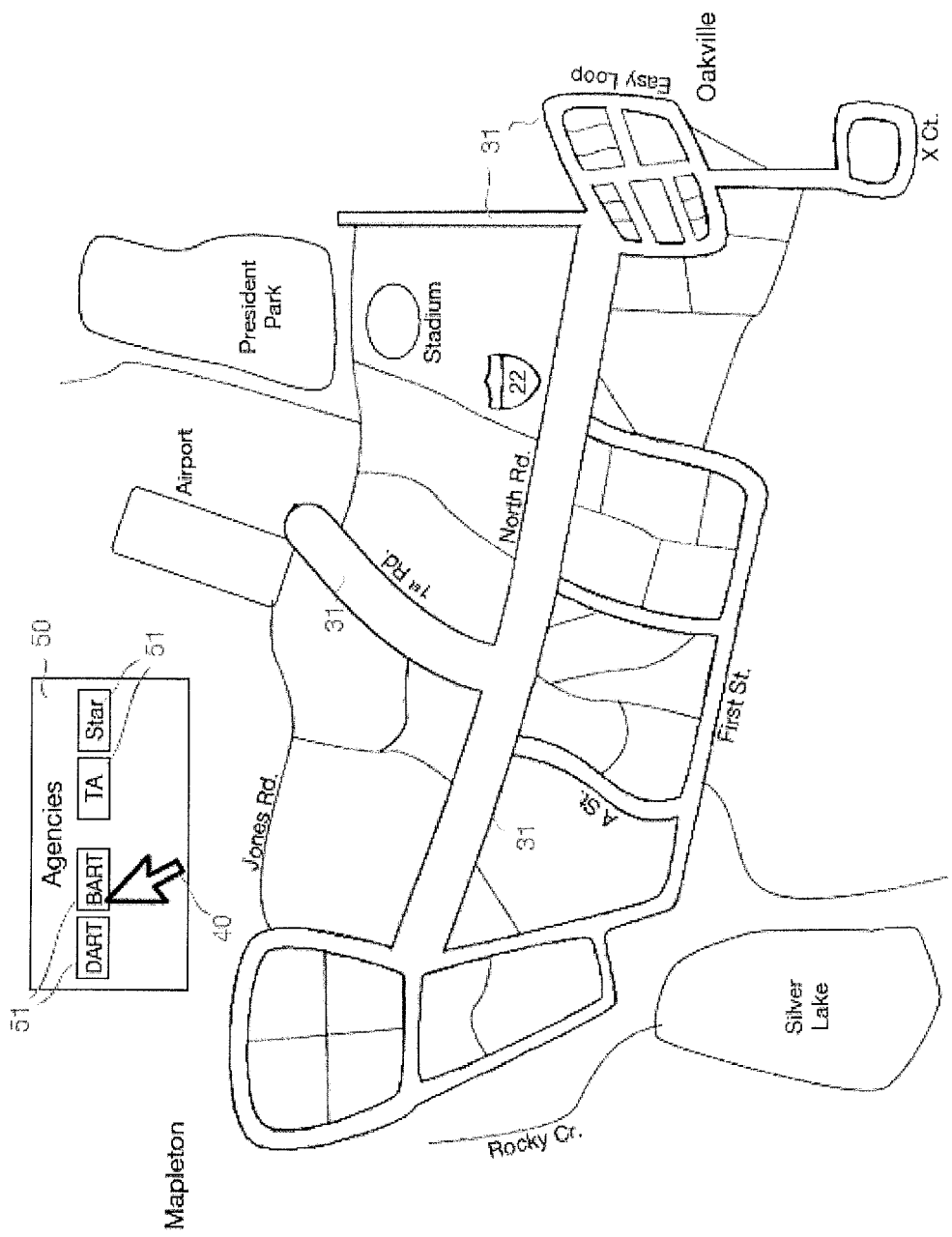

In another embodiment, all the routes 32 remain displayed with the husks 31 of the selected routes 32 being displayed in a larger format than the husks 31 of the non-selected routes 32. By way of example, the selected routes 32 may be displayed with a first width and the non-selected routes 32 may be displayed with a narrower second width. This difference allows for particular routes 32 to be emphasized using size relationships instead of color or lighting. FIG. 15A illustrates an embodiment of the different size relationship. The husks 31 of the routes 32 serviced by the selected Agency are displayed in a wider format. In the specific embodiment of FIG. 15A, this includes the BART agency that services North Road and $1^{st}$ Road. The husks 31 of the other non-selected routes 32 are also displayed, but in a narrower format. In the example of FIG. 15A, this includes the routes serviced by the DART, TA, and Star agencies.

When completed, the user can move the cursor 40 away from the selected agency which causes the highlighted routes 32 to be removed from the map. The user may then move the cursor 40 to another agency aspect 51 to see their bus routes 32 highlighted on the map. In one embodiment, this occurs when the user clicks on the agency aspect 51. Other embodiments may include using a checkbox or a lock icon. This will keep these routes 32 highlighted when the cursor 40 is removed from the aspect 51. This may also allow the user to select another agency to highlight their bus routes 32 simultaneously on the display 16. Any routes that overlap may be illustrated in an interleaving pattern, or otherwise indicate that they are shared by multiple agencies.

The system may be configured to include in the palette 50 just the agencies that service the area included in the map. Therefore, reducing the area of the map or panning the map to a different geographic region may increase or decrease the number of agency options. By way of example, FIG. 14 includes the display 16 with a map illustrating a relatively large geographic area. This large geographic region is serviced by a first number of agencies. FIG. 14 includes a specific example of four agencies (DART, BART, TA and Star).

Figure 16:
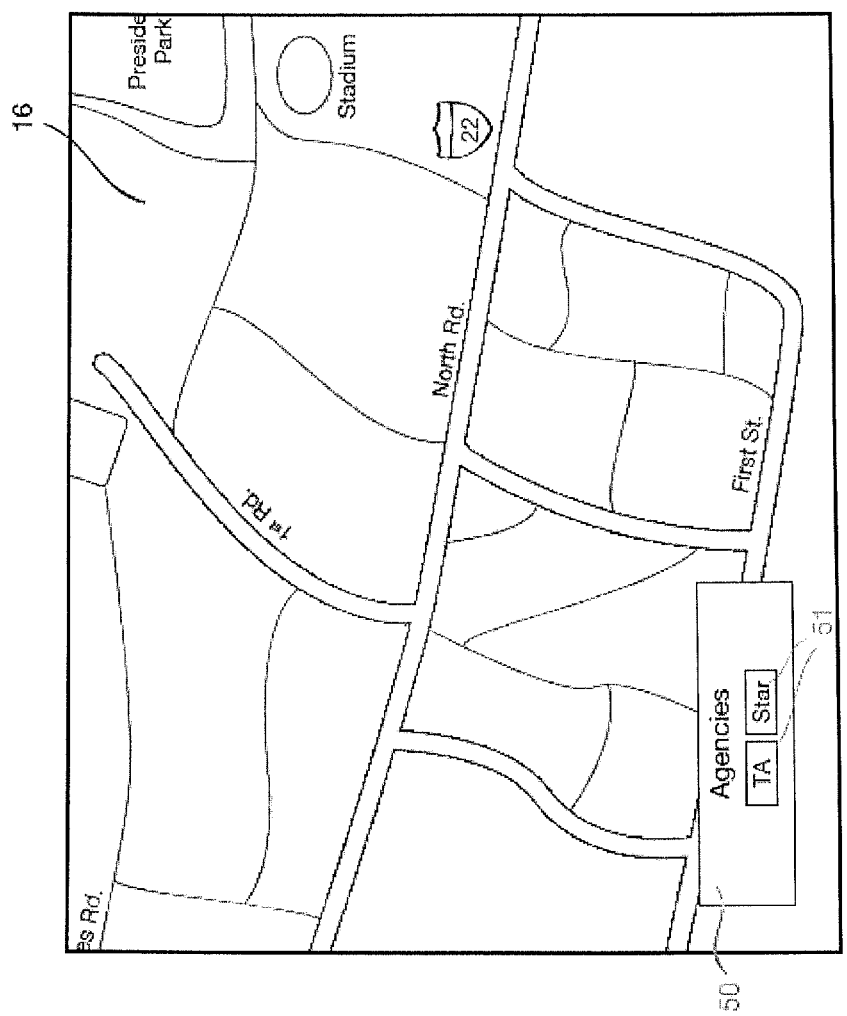

FIG. 16 includes a smaller geographic area being illustrated in the display 16. This smaller area is serviced by a smaller number of agencies and those are the only options illustrated in the palette 50. Specifically, the geographic area of FIG. 16 is serviced by agencies TA and Star. This feature again only displays potentially relevant information to the user without burdening the user with unwanted or extra non-relevant information that may just clutter the map and/or make it difficult to comprehend.

Figure 17:
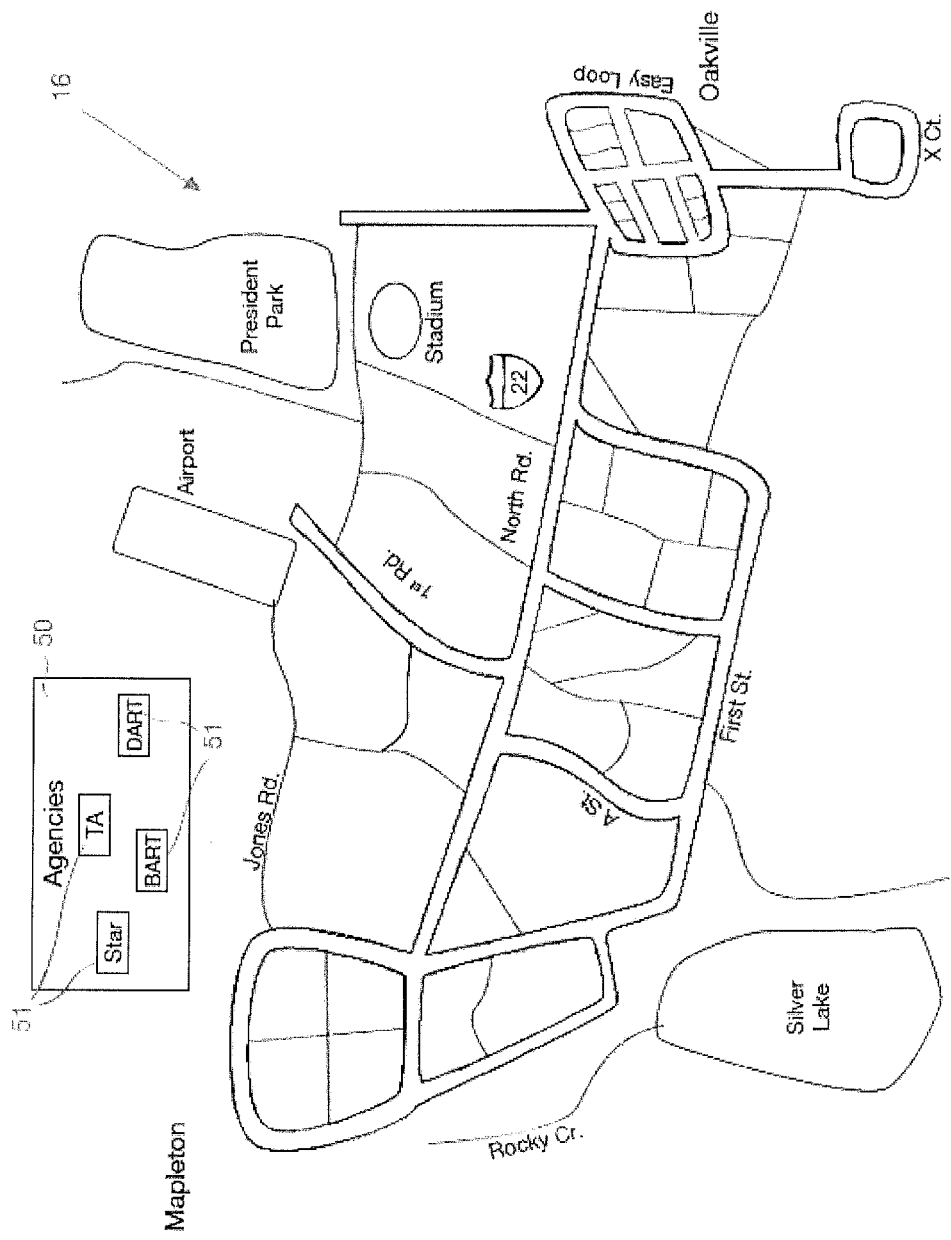

The palette 50 may also display the various indicators in a manner that corresponds to their position within the map. FIG. 17 includes an embodiment with the agencies aspects 51 located in the pallet 50 roughly according to the geographic areas that they serve. In this example, the Star agency is positioned to the upper left of the palette 50 that corresponds to the town of Mapleton which is their main service area. The BART agency is positioned in the lower central section of the palette 50 that corresponds to the Silver Lake area of the map. The TA agency is located in a position that corresponds to the Airport which is their main service area. Likewise, the DART agency is located to the right of the palette 50 to indicate the agency serves the Oakville region. The correlation on the display 16 between the positional layouts for the palette 50 and map assists the user in quickly and accurately obtaining information from the system.

Figure 18:
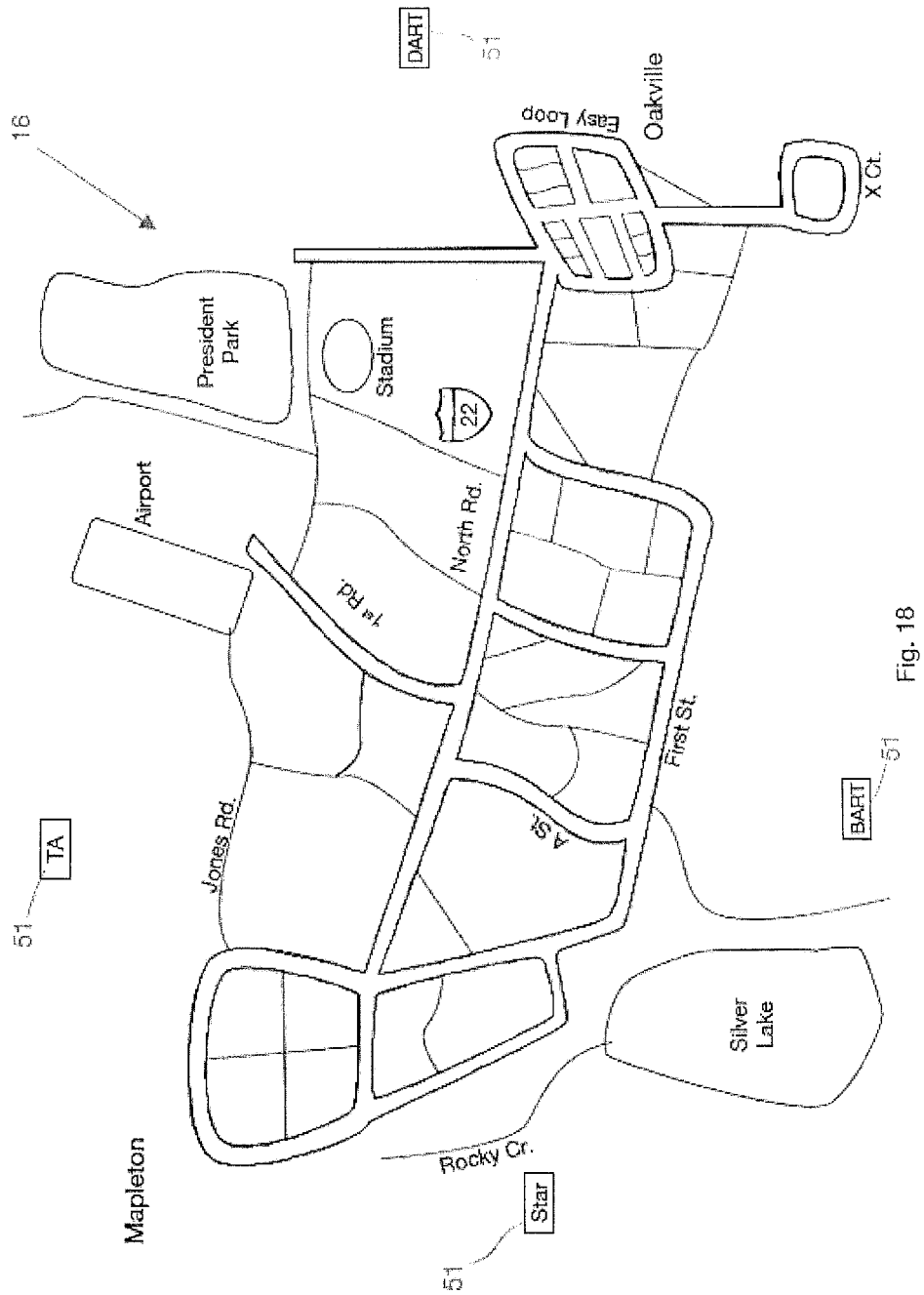

In another embodiment as illustrated in FIG. 18, the agency aspects 51 are not be constrained to a palette 50. Rather, they float along the outer edges of the display 16 while maintaining their relative positions to the geographic area.

The positional layouts of the palette 50 may change when the display changes due to panning to a different geographic region or altering the size of the map that is on the display. The change in the layout of the agency aspects 51 occurs because the geographic area viewed by the user changes. Using the example of FIG. 17 as an example, panning the display towards Mapleton and away from Oakville (i.e., panning to the left in FIG. 17) will cause the aspects 51 in the palette 50 to also shift. In this specific embodiment, this will cause the DART aspect 51 to be removed from the palette 50 because this agency does not service the geographic area on the map 15 (DART agency only services the Oakville area which is no longer displayed). The other three agency aspects 51 (TA, BART, Star) will shift to the right of the palette 50 to maintain their correlation with the areas they service on the map 15.

The visual appearance of the agency aspects 51 in the palette 50 may be based on a percentage of the serviced routes 32 for each agency. In one embodiment, the amount of serviced routes for each agency in the current display 16 is determined. The total amount of serviced routes in the display 16 is also determined as an accumulation of the serviced routes of each agency. The percentage of serviced routes for each agency is determined by dividing the amount of serviced routes for each agency by the total amount of serviced routes. The aspects 51 for the various agencies are then displayed in the palette 50 based on the individual percentages. Agencies with larger percentages may be displayed in a more prominent manner than other lesser servicing agencies. This may include displaying the larger agencies before the lesser agencies (e.g., in descending order), displaying the agencies indicators in different sizes, and displaying the agency indicators in highlights or different colors.

An example of the percentage of the total route network can be illustrated using the display of FIG. 14. For purposes of this example, the DART agency services 50 miles in the display 16, the BART agency services 25 miles, the TA agency services 15 miles, and the Star agency services 10 miles. The agency aspects 51 are displayed with the DART agency being most prominent because this agency services the most amount of routes (i.e., 50%), followed by the BART agency at 25%, TA agency at 15%, and the Star agency at 10%.

The percentage of the total route network will change as the display 16 changes due to panning or changing the display size. This will cause corresponding changes in the display of the aspects 51. The system may be configured to dynamically calculate the percentages and dynamically change the aspects 51 accordingly.

In another embodiment, the system displays an agency indicator based on the percentage of the agency's total serviced routes that are currently in the display 16. By way of example, an agency may service a total of 100 miles of routes, with a current display including 30 miles of the serviced routes 32. The agency's aspect 51 in the palette 50 would indicate a setting of 30% (i.e., 30/100). Agencies with larger percentages may be displayed in a more meaningful manner than other lesser agencies.

These percentages again will change dynamically as the user pans and zooms. In one embodiment, the agency's aspect 51 will have different appearances depending upon the amount of their serviced routes currently in the display 16. In one embodiment, an agency's indicator may fade or become transparent corresponding to how much of their route network has disappeared as the user zooms or pans the display. By way of example, an initial display may include 50% of an agency's route network. The agency aspect 51 may have an initial brightness when the view includes 50% of their route network. This percentage decreases as the user pans away from the geographic area serviced by the agency. The brightness of the indicator may gradually lessen as the user pans away from the agency's network and ultimately the indicator disappears from the display 16 when none of the serviced routes are included in the display. Similar embodiments may vary the size of the indicator depending upon the percentage.

The system may also display on the &lap targets 60 moving along the various routes 32. The system may just include the targets 60 for the routes 32 selected by the user. FIG. 15 includes an embodiment with the targets 60 positioned at various locations along the selected routes 32. In the embodiment of FIG. 15, the targets represent buses. Other applications may include the different targets as discussed above.

Tracking the location of targets 60 as they move around the various routes 32 may be provided using a number of technologies. In one embodiment, a Global Positioning System ("GPS") tracking system is used. GPS uses a network of satellites to triangulate the position of a receiver and provide position coordinates. To that end, the targets 60 may each be provided with a GPS receiver device that works in conjunction with the satellites to determine a current position (often in terms of a latitude and longitude coordinate set) for the target 60. The current position of each target 60 is updated within the GPS receiver device through communications with the satellites.

Other means of determining the position of the targets 60 may be used. One example includes using accelerometers to calculate distances traveled based upon time and acceleration values. Another similar technique uses dead reckoning as a process of estimating a global position of the target 60 by advancing a known position using course, speed, time and distance traveled. Another embodiment includes equipping the target 60 with a tracking device that permits location tracking using a more passive approach. For instance, the target 60 may comprise a node, button, or tag, such as an RFID tags that may be tracked by a geographic information system.

Regardless of the method used to determine a current position, the data representative of the position of the target 60 is transmitted to a tracking server. In one embodiment, the target 60 is provided with a mobile communications device that permits data transmission to and from a communications station. In one embodiment, the mobile communications device is able to send transmissions but not receive transmissions. The communications station may comprise a transceiver (e.g., tower) and a base station. The base station comprises the necessary hardware/software to convert the received wireless data (which may be cellular, circuit switched, or packet switched data) to a suitable data protocol for transmission over a network such as the Internet.

Examples of tracking the locations of targets along routes are disclosed in U.S. Pat. No. 7,920,967 which is incorporated by reference in its entirety.

The ability of the system to track the location of targets 60 along the routes provides additional information that may be relevant to the user. The system is able to display the expected arrival time of various targets 60 relative to various points along the routes 32. In one example, the system can display the expected arrival time of a bus to a particular bus stop 33. Using FIG. 13 as an example, after the user selects a particular bus stop, the system can display the expected time when the bus will arrive at the particular bus stop.

The system may be configured to receive inputs by moving a cursor over a particular point of interest on the map. In areas on the map that include more detail, the cursor 40 may need to be positioned directly over the particular area. By way of example using FIG. 15, the areas that include multiple different route husks 31 around the town of Oakville may require that the cursor 40 be positioned directly on the particular route husk 31 prior to the system displaying additional information. In other areas that are not so congested, the system may display the additional information when the cursor is in the area of the particular point. Again using FIG. 15 as an example, the area around the airport may require that the cursor 40 be positioned in the vicinity of $1^{st}$ Rd. for the system to display the additional information. This sensitivity setting may vary across the display 16, and further may be adjusted by the user as necessary.

The system may be configured for the user to select the desired sensitivity or size of the affected area around the cursor 40. The size is a selected number of pixels around a selected point represented by the cursor 40. As the cursor 40 is moved around the display 16, additional information that that is within the area of affect will be displayed.

The system may be configured for the user to select the desired area of affect of the cursor 40. The options may include narrow (for a relatively small area of affect), medium, and wide. The options may also allow the user to specifically set the size of the pixel radius that defines the area of affect.

The systems and methods may be configured to receive various types of input. One type of input is from the user. Examples of a user input include signals from a keyboard 3, mouse 4, or touch screen. Another type of input may be a location input based on the geographic location of the device 1. The device 1 may include a navigational receiver 99 (FIG. 1) to determine its geographic position. The navigational receiver 99 may include a GPS system as described above. The location input may also be determined based on an accelerometer, dead reckoning, or an RFID tag associated with the device 1. This geographic position functions as an input used by the system to reveal relevant route information in proximity to the location of the device 1. More detailed route information may be displayed upon the receipt of a user input. The location input may be useful in applications where the device 1 is a mobile terminal such as a hand-held device that is carried by the user or a device mounted in the user's vehicle.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The system may further be configured to print the various maps that appear on the electronic displays 16. The present embodiments are, therefore, to be considered in all respects as illustrative and not restrictive, and all changes coming within the meaning and equivalency range of the appended claims are intended to be embraced therein.

What is claimed is:

1. A method implemented by a server communicatively coupled to a client device for causing the client device to display a graphical depiction of route information on an electronic display, the method comprising sending the client device executable instructions that, when executed by one or more processing circuits of the client device, cause the client device to:

prior to receiving an input regarding a single location on the display, display each of serviced routes that extend within a geographic area and also display non-serviced routes within the geographic area, each of the serviced routes within the geographic area being displayed as continuous husks that extend along the entirety of the serviced routes throughout the geographic area, each of the husks having a common appearance that is different than the non-serviced routes and provides a uniform visual indication of an aggregate of the serviced routes; and responsive to receiving the input regarding the single location on a selected one of the serviced routes, continue to display each of the serviced and non-serviced routes in the same visual manner as prior to receiving the input and display an additional highlight on the selected serviced route that has a different appearance than the non-serviced routes and the other serviced routes.

2. The method of claim 1, wherein the executable instructions cause the client device to display the serviced routes with broad indicators that are wider than indicators for the non-serviced routes and that have a different color than the indicators for the non-serviced routes.

3. The method of claim 2, wherein the additional highlight on the selected route includes a narrow indicator positioned within the corresponding broad indicator of the selected route.

4. The method of claim 1, wherein the executable instructions cause the client device to display the additional highlight by highlighting an entirety of the selected route throughout the geographic area.

5. The method of claim 1, wherein the executable instructions further cause the client device, responsive to additional input regarding the selected route, to display a palette spaced away from the selected route, the palette including at least a name of the selected route.

6. The method of claim 1, wherein the executable instructions further cause the client device, responsive to additional input, to change a scale of the graphical depiction, display specific stops located along the selected route, and display a target that moves along the selected route.

7. The method of claim 1, wherein the executable instructions cause the client device to display the additional highlight responsive to determining that a cursor is positioned over the selected route, and to remove the additional highlight upon determining the cursor is positioned away from the selected route.

8. The method of claim 1, wherein the executable instructions cause the client device to display the serviced routes by displaying the serviced routes with first indicators along those serviced routes, and to display the additional highlight on the selected route by overlaying a second indicator over the corresponding first indicator of the selected route.

9. A method for causing a client device to display a graphical depiction of route information on an electronic display, the method comprising sending the client device executable instructions that, when executed by one or more processing circuits of the client device, cause the client device to:

prior to receiving an input of a single selected location within a geographic area that lies on a first route, initially display each of the serviced routes and non-serviced routes that extend within a geographic area, each of the serviced routes being displayed with a first indicator having a first appearance along its entirety within the geographic area and each of the non-serviced routes being displayed with a different second indicator having a different second appearance; and responsive to receiving the input regarding the single arbitrary selected location within the geographic area that lies on the first route of the serviced routes, display the first route continuously within the geographic area along the entirety of a length with a combination of the first indicator and a third indicator that are each visible along the first route, display a remainder of the serviced routes with the first indicator and display the non-serviced routes with the second indicator, the combination of the first indicator and the third indicator having a third appearance that is different than the first and second appearances.

10. The method of claim 9, wherein the first indicator is a broad stripe and the third indicator is a narrow line positioned within an interior space of the broad stripe, and wherein the third indicator has a different color than the first indicator.

11. The method of claim 9, wherein the executable instructions further cause the client device, responsive to additional input regarding the first route, to display a palette spaced away from the first route, the palette including at least a name of the first route.

12. The method of claim 9, wherein the executable instructions further cause the client device to display a target moving along the first route.

13. A server including a communications interface configured to communicatively couple to a client device and one or more processing circuits configured to send the client device, via the communications interface, executable instructions that, when executed by one or more processing circuits of the client device, cause the client device to display a graphical depiction of route information on an electronic display, the executable instructions configured to cause the client device to:

without receiving from a user an identification of one or more of a plurality of serviced routes, display each of the plurality of serviced routes that extend within a geographic area and also display non-serviced routes that extend within the geographic area, each of the serviced routes being displayed continuously throughout an entirety of the geographic area with a first indicator having a first appearance and each of the non-serviced routes being displayed with a different second indicator having a different second appearance, the first appearance having a uniform visual indication that conveys an aggregate of the serviced routes; and responsive to receiving input regarding a single selected location within the geographic area that lies on a first route of the serviced routes, display the first route continuously along the entirety of the length with a combination of the first indicator and a third indicator, display a remainder of the entireties of the serviced routes with the first indicator and display the non-serviced routes with the second indicator, the combination of the first indicator and the third indicator having a third appearance that is different than the first and second appearances.

14. The server of claim 13, wherein the first indicator is a broad stripe and the third indicator is a narrow line positioned within an interior space of the broad stripe, and wherein the third indicator has a different color than the first indicator.

15. The server of claim 13, wherein the executable instructions cause the client device to display the first route with a combination of the first indicator and the third indicator by overlaying the third indicator over the first indicator.

16. The server of claim 13, wherein the executable instructions further cause the client device, responsive to additional input regarding the first route, to display a palette spaced away from the first route, the palette including at least a name of the first route.

17. The server of claim 13, wherein the executable instructions further cause the client device, responsive to receiving additional input regarding a second selected location that lies on a second route of the serviced routes, continuing to display the first route with the combination of the first indicator and the third indicator and displaying the second route with a combination of the first indicator and a fourth indicator, the combination of the first indicator and the fourth indicator having a fourth appearance that is different than the first, second, and third appearances.

18. The server of claim 17, wherein the executable instructions cause the client device to display overlapping portions of the first and second routes with a combination of the third and fourth indicators, the combination of the third indicator and the fourth indicator having a fifth appearance that is different than the first, second, third, and fourth appearances.

* * * * *